(12) United States Patent
Sakasai et al.

(10) Patent No.: US 6,209,513 B1
(45) Date of Patent: Apr. 3, 2001

(54) INDUCTIVE LOAD DRIVING DEVICE AND DRIVING METHOD

(75) Inventors: Takashi Sakasai, Showa-machi (JP); Jiro Akagi, Columbus, IN (US); Daisuke Yoshida, Hadano (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/214,236

(22) PCT Filed: Jun. 27, 1997

(86) PCT No.: PCT/JP97/02245

§ 371 Date: Dec. 31, 1998

§ 102(e) Date: Dec. 31, 1998

(87) PCT Pub. No.: WO98/00637

PCT Pub. Date: Jan. 8, 1998

(30) Foreign Application Priority Data

Jul. 2, 1996 (JP) .................................................. 8-192855
Jan. 23, 1997 (JP) .................................................. 9-026038

(51) Int. Cl.[7] ........................................................ F02B 3/10
(52) U.S. Cl. ............................ 123/299; 123/490; 361/154
(58) Field of Search ................................... 123/299, 490; 361/154

(56) References Cited

U.S. PATENT DOCUMENTS

| | | | |
|---|---|---|---|
| 3,727,592 | * 4/1973 | Wilkinson | 123/490 |
| 4,732,129 | 3/1988 | Takigawa et al. | 123/478 |
| 4,862,866 | * 9/1989 | Calfus | 123/490 |
| 5,402,760 | * 4/1995 | Takeuchi et al. | 123/490 |
| 5,532,526 | * 7/1996 | Ricco et al. | 123/490 |
| 6,005,763 | * 12/1999 | North | 361/154 |

FOREIGN PATENT DOCUMENTS

| | | |
|---|---|---|
| 0581300 | 2/1994 | (EP) . |
| 59-155899 | 10/1984 | (JP) . |
| 61-241438 | 10/1986 | (JP) . |
| 2-119652 | 5/1990 | (JP) . |
| 3-275957 | 12/1991 | (JP) . |
| 4-500399 | 1/1992 | (JP) . |
| 6-54590 | 2/1994 | (JP) . |
| 6-159184 | 6/1994 | (JP) . |
| 7-79597 | 3/1995 | (JP) . |
| 9-89147 | 3/1997 | (JP) . |
| 9-148172 | 6/1997 | (JP) . |
| 9-217641 | 8/1997 | (JP) . |

* cited by examiner

Primary Examiner—Erick Solis
(74) Attorney, Agent, or Firm—Sidley & Austin

(57) ABSTRACT

An inductive load driving device in which the rise of load current at an initial stage of driving can be executed at high speed includes a plurality of step-up circuits (21, 31), for alternately applying a high voltage to the same inductive load within a predetermined period of time, to thereby allow each load current to rise at a high speed; a holding current output circuit (43), for applying a predetermined voltage to the same inductive load after the load current has risen, to thereby hold the load current at a predetermined value; a plurality of switching means (46, 47), adapted to be switched in such a manner that the respective outputs of the plurality of step-up circuits (21, 31) and the holding current output circuit (43) can be alternately connected to the same inductive load; and a control logic circuit (44), for switching the plurality of switching means (46, 47) in a predetermined sequence.

13 Claims, 15 Drawing Sheets

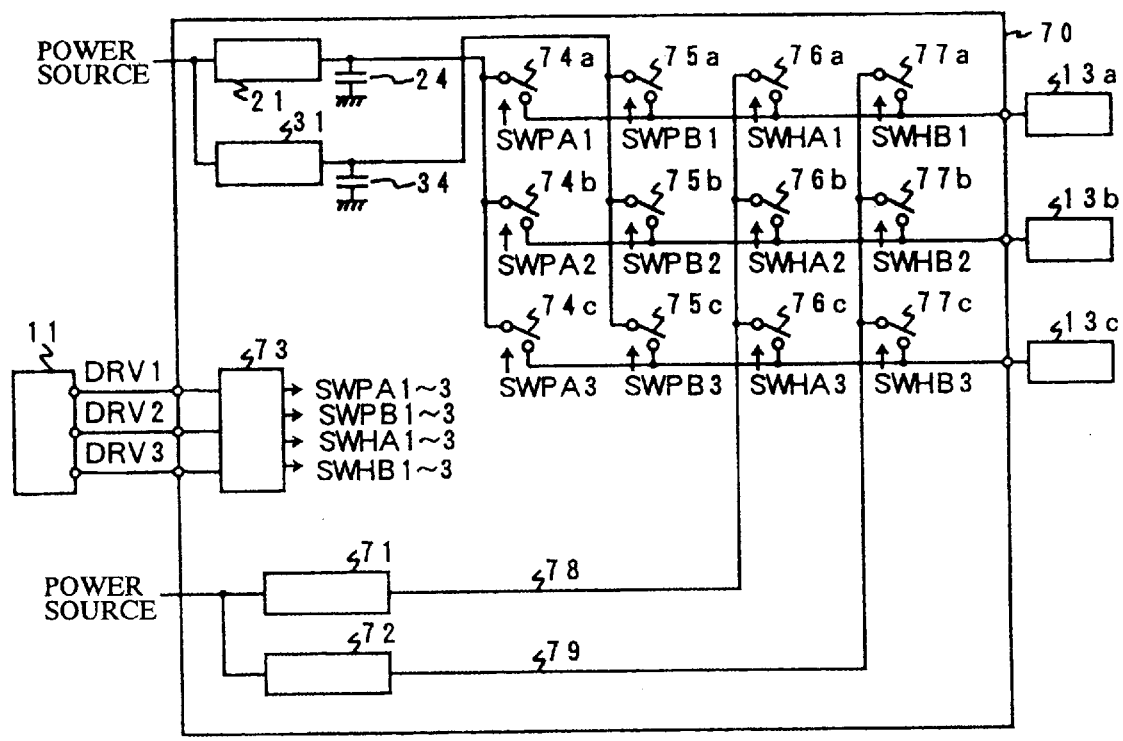
F I G. 1 6

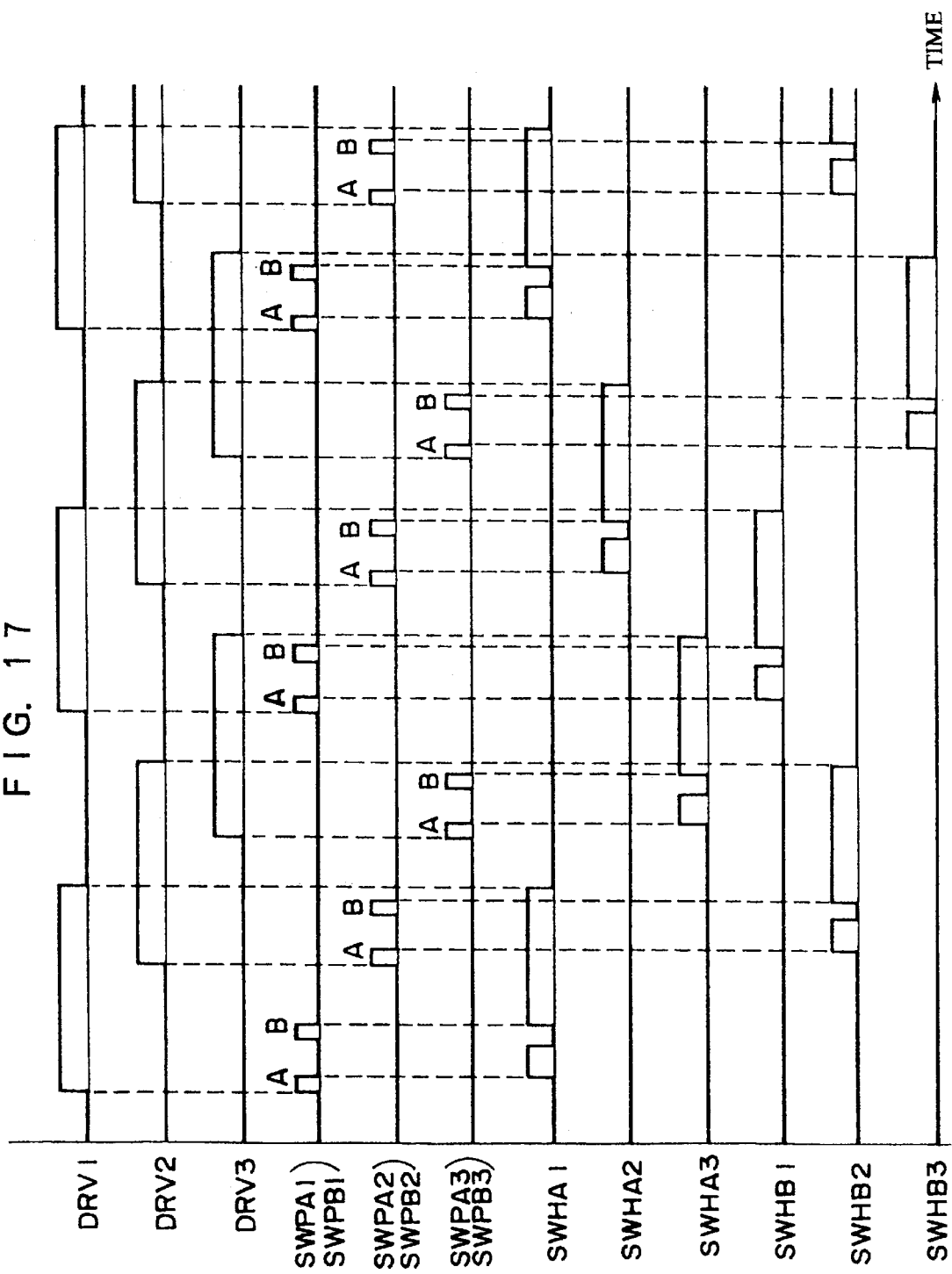

| | CP | 1 | 2 | 3 | 4 | 5 | 6 | 7 | 8 | 9 | 10 | 11 | 12 |
|---|---|---|---|---|---|---|---|---|---|---|---|---|---|
| I-PHASE | 7 a | 1 | 1 | 1 | 0 | 0 | 0 | 0 | 0 | 0 | 1 | 1 | 1 |
| I-PHASE | 7 b | 1 | 1 | 1 | 1 | 0 | 0 | 0 | 0 | 0 | 0 | 1 | 1 |
| II-PHASE | 8 a | 0 | 1 | 1 | 1 | 1 | 1 | 1 | 0 | 0 | 0 | 0 | 0 |
| II-PHASE | 8 b | 0 | 0 | 1 | 1 | 1 | 1 | 1 | 1 | 0 | 0 | 0 | 0 |
| III-PHASE | 9 a | 0 | 0 | 0 | 0 | 0 | 1 | 1 | 1 | 1 | 1 | 1 | 0 |
| III-PHASE | 9 b | 0 | 0 | 0 | 0 | 0 | 0 | 1 | 1 | 1 | 1 | 1 | 1 |

INDUCTIVE LOAD DRIVING DEVICE AND DRIVING METHOD

TECHNICAL FIELD

The present invention relates to an inductive load driving device and a method for driving that device in which the same inductive load (coil) is driven a plurality of times within a short period of time.

BACKGROUND ART

Hitherto, there have been many cases wherein the same inductive load needed to be driven a plurality of times within a predetermined period of time. Examples of such cases are the solenoid driving of a fuel injector in an internal combustion engine, the phase coil driving in an equivalent polyphase driving system of a step motor, and the like. In the case of a diesel engine as one of the above examples, considerable improvements in fuel injection methods have been made for measures regarding the exhaust gas and, more particularly, for a decrease in the concentration of $NO_x$. As one of these methods, a method has been proposed in which a pilot injection is executed prior to the main injection at the time of fuel injection in an electronically controlled unit fuel injector. In this method, a predetermined quantity of fuel is pilot-injected at a predetermined time immediately before the main injection of fuel in a pressurizing process. Combustion is gently conducted, the concentration of $NO_x$ is decreased, and also the noise of the engine is reduced, by optimally controlling the timing and the quantity of the pilot injection. A conventional pilot injection-system unit injector drives a solenoid valve, which controls the fuel injection, two times consecutively in synchronization with the predetermined timings of pilot injection and main injection.

It is usually required to promptly make a load current rise or to promptly reduce the same in order to drive an inductive load, such as a solenoid valve, with good responsiveness. To this end, as a method of promptly reducing a load current, a method is generally adopted in which a component, such as a resistance, a voltage limiting element, or the like, which absorbs energy when an electric current reduces, is inserted into an electric current circulating path which includes the load, and energy stored in an inductance of the load is consumed. In addition, a method of applying a high voltage at an initial stage of driving is often adopted so as to allow the load current to rise promptly. In this case, if the application of the high voltage continues after the solenoid valve is operated, the heat which is generated in the solenoid valve or the driving circuit increases, thereby lowering the efficiency of the load. Therefore, after the solenoid valve has finished operating, the driving is usually conducted at a voltage lower than the high voltage which was used at the initial stage of driving.

For the aforesaid reasons, a solenoid valve driving device of the conventional unit fuel injector includes a step-up circuit, for obtaining the initial high voltage from a supply voltage supplied from an on-vehicle battery, and a holding current output circuit, for holding the solenoid valve at a predetermined current value after the solenoid valve has finished operating. Generally, a capacitor for storing the energy required for the initial stage of load driving as an electric charge, an inductance for storing the energy as magnetic energy, or the like is provided in the step-up circuit, and the stored energy is promptly given to the load at the initial stage of load driving. The energy required for the initial stage is energy given to the load and energy needed for the displacement of the load as an actuator. Thus, the responsiveness of the solenoid valve at the time of a pilot injection and a main injection is improved, whereby the delay of injection timing is avoided.

However, in the conventional solenoid driving device, the same solenoid valve needs to be driven two times within a short period of time, and thus the step-up circuit is required to store a predetermined quantity of energy in the capacitor or the inductance for storing energy within the short period of time to thereby step up the voltage. The shorter the period of time required for storing the energy becomes, the larger the capacity which is needed for each power electro element for storing the energy of the step-up circuit (for example, a thyristor, a transformer, or the like). However, if an element with a large capacity is used, the step-up circuit increases in size and the cost sharply increases, which makes it difficult to make a step-up circuit with plenty of capacity. Accordingly, in a conventional driving circuit, there arises a case wherein the second step-up in the voltage is delayed. In the case of the aforesaid fuel injection, the response of the solenoid valve at the time of a main injection is delayed at this time, and thereby the behavior between the pilot injection and the main injection becomes unstable. Consequently, there arises a disadvantage in that an effect on a reduction in the concentration of $NO_x$ can not be sufficiently obtained.

A case of a step motor will be explained. In order to improve responsiveness, it is usually necessary to increase the number of phases or poles. An equivalent polyphase driving system is well known in which, for example, in relation to a three-phase machine, the phases are equivalently increased to twelve phases by increasing the number of apparent phases. FIG. 22 shows a circuit diagram of an example of an exciting coil portion of an equivalent twelve-phase driving system. In FIG. 22, coils 1, 2 and 3 are provided corresponding to a first phase through a third phase, and one end of each coil is connected to the positive electrode of a power source. Between the other end of the coil 1 and the negative electrode of the power source, a series circuit of a resistance 4a and a transistor 7a and a series circuit of a resistance 4b and a transistor 7b are connected in parallel. Similarly, between the other end of the coil 2 and the negative electrode of the power source, a series circuit of a resistance 5a and a transistor 8a and a series circuit of a resistance 5b and a transistor 8b are connected in parallel, and between the other end of the coil 3 and the negative electrode of the power source, a series circuit of a resistance 6a and a transistor 9a and a series circuit of a resistance 6b and a transistor 9b are connected in parallel. The base of each respective transistor is connected to a driving device, which is not shown, and the driving device sequentially outputs an ON signal to the bases of the respective transistors to electrify the respective transistor and to sequentially send an exciting current to the respective coil 1, 2, or 3. The current value of each phase at this time is set at two ways of 1:2 by the two resistances (for example, the resistances 4a and 4b) of each phase, and the exciting sequence of each phase by the current is shown by FIG. 23. In the drawing, "1" represents the "ON" state of the respective transistor. When the exciting current values of respective phases are sequentially increased and decreased repeatedly while shifting phases, three rotor stable positions are provided among the respective phases by the composition of the magnetomotive forces of the respective phases. As a result, an equivalent twelve-phase driving is realized, and the driving frequency is improved.

At this time, each phase coil needs to be driven twice within a predetermined period of time like a phase I at the time when the sequence in FIG. 23, for example, changes from 9 to 10 and from 10 to 11. Therefore, also in the step motor of such a system, it is conceivable that a high voltage is applied at an initial stage of driving similarly to the above in order to allow the load current of a respective one of the coils 1, 2, and 3 to promptly rise.

However, in the driving device of the step motor, disadvantages arise, as described below. As the rotation of the step motor speeds up, the time interval for driving the respective phase coil becomes shorter, whereby the same phase coil needs to be driven twice within a short period of time. Thus, the step-up circuit requires an element with a large capacity, capable of storing energy within a short period of time, which causes disadvantages in that the step-up circuit increases in size and in cost.

SUMMARY OF THE INVENTION

The present invention is made to eliminate the above disadvantages of the prior art and its object is to provide an inductive load driving device and a driving method in which the same inductive load can be driven a plurality of times within a predetermined period of time without increasing the size of the step-up circuit, and in which the rise of the load current at an initial stage of driving can be executed at high speed.

An inductive load driving device according to the present invention is an inductive load driving device which drives the same inductive load a plurality of times within a predetermined period of time and executes the driving repeatedly, characterized by including:

a plurality of step-up circuits, each for alternately storing energy to step up a voltage to a high voltage and applying the high voltage to the same inductive load within a predetermined period of time to allow the respective load current to rise at a high speed;

a holding current output circuit for applying a predetermined voltage to the same inductive load, after the load current has been raised by a respective one of the plurality of step-up circuits, to hold the load current at a predetermined value;

a plurality of switching means, which are switchable in such a manner that a respective output of the plurality of step-up circuits and the output of the holding current output circuit are alternately connected to the same inductive load; and a control logic circuit for switching the plurality of switching means in a predetermined sequence;

wherein the rise of a current sent to the same inductive load a plurality of times within a predetermined period of time is speeded up.

According to the aforesaid configuration, the plurality of step-up circuits are provided, and a high voltage at an initial stage of driving is applied by each respective one of the step-up circuits when the inductive load is driven a plurality of times. At this time, ample energy can be stored with time to spare by the time when a respective step-up circuit is required to next apply a high voltage, whereby there no longer arises a delay in the response of the inductive load. Since more time is given for storing the energy, as compared with the conventional case where an inductive load is driven a plurality of times by a single step-up circuit, the current capacity of each step-up circuit can be greatly decreased as compared with the conventional one. Accordingly, the step-up circuit can be decreased in size and in cost, and the reliability of the driving device is improved.

Instead of the plurality of step-up circuits an inductive load driving device can include:

a single step-up circuit;

a plurality of capacitors for alternately storing high-voltage energy and then giving the stored high-voltage energy to the same inductive load within a predetermined period of time;

a plurality of rectifying devices, each connected to a respective one of the capacitors, for sending a charging current to the respective capacitor only in the direction in which energy is stored; and an inductive circuit for storing energy in the respective capacitors through the respective rectifying devices.

According to the aforesaid configuration, instead of the plurality of step-up circuits, the single step-up circuit for storing high-voltage energy in the plurality of capacitors from one inductive circuit via the respective rectifying devices is provided. When the same inductive load is driven a plurality of times, a high voltage at an initial stage of driving is applied from each capacitor. At this time, ample energy can be stored with time to spare by the next time when each capacitor is required to apply a high voltage, whereby there no longer arises a delay in the response of the inductive load. Since more time is given for storing the energy as compared with the conventional case where an inductive load is driven a plurality of times by a single step-up circuit, the current capacity of the step-up circuit can be greatly decreased as compared with the conventional one. Accordingly, the step-up circuit can be decreased in size and in cost, and the reliability of the driving device is improved.

Moreover, the respective capacitors can have different capacities. According to this configuration, energy is stored in the plurality of capacitors with different capacities for the same inductive load, whereby the quantity of energy given to the inductive load from each of the capacitors can be changed each time. Thus, it becomes possible to deal with various driving patterns of load current by setting the capacities of the respective capacitors at different values depending on the purposes of the inductive load driving.

Further, the inductive load can be a solenoid of each of the solenoid valves in a fuel injector for an internal combustion engine which controls the start time and the finish time of fuel injection by the solenoid valves.

According to the aforesaid configuration, two step-up circuits are provided, and the load current of each solenoid valve at the times of pilot injection and main injection can promptly rise responsive to each of the step-up circuits. At this time, there is enough time before the next injection timing, and thus storage of energy can be performed without increasing the current capacity of each element as compared with the conventional one. Consequently, there no longer arises a delay in the response of the solenoid valves at the time of pilot injection and main injection, and the timing and the quantity of fuel injection can be precisely controlled, thereby certainly reducing the concentration of $NO_x$ or the noise.

Furthermore, it is possible that the plurality of step-up circuits include a first step-up circuit and a second step-up circuit, and that the holding current output circuit includes a first holding current output circuit and a second holding current output circuit, wherein the first step-up circuit and the first holding current output circuit drive the solenoids in the fuel injectors corresponding to the respective cylinders in the internal combustion engine at the time of pilot injection, the second step-up circuit and the second holding current output circuit drive, at a time of main injection, the same solenoid that was driven at the time of the pilot injection, and the plurality of switching means execute switching from/to the outputs of the first step-up circuit and the first holding current output circuit at the time of the pilot injection and to/from the outputs of the second step-up circuit and the second holding current output circuit at the time of the main injection.

According to the aforesaid configuration, the first step-up circuit and the first holding current output circuit are used exclusively for pilot injection, the second step-up circuit and the second holding current output circuit are used exclusively for main injection, and a load current of each solenoid valve at the time of pilot injection and main injection can promptly rise with the respective set of a step-up circuit and a holding current output circuit. At this time, there is enough time before the next injection timing, and thus storage of energy can be performed without increasing the current capacity of an element of each step-up circuit as compared with the conventional one. Consequently, there no longer arises a delay in the response of the solenoid valves at the time of a pilot injection or a main injection, and the timing and the quantity of fuel injection can be precisely controlled, thereby certainly reducing the concentration of $NO_x$ or the noise. In addition, the average heat tolerance quantity of the holding current output circuit, which is used exclusively for pilot injection, can be decreased more than that of the holding current output circuit which is exclusively used for main injection, which enables a decrease in size and composition an a lower cost.

It is possible that the plurality of step-up circuits include a first step-up circuit and a second step-up circuit and that the holding current output circuit includes a first holding current output circuit and a second holding current output circuit, wherein the first step-up circuit and the first holding current output circuit drive a solenoid in the fuel injector, corresponding to a first cylinder in the internal combustion engine, at the time of pilot injection and drive a solenoid, corresponding to a second cylinder which injects fuel next after that first cylinder, at the time of main injection, and the driving at the time of each of the injections is repeated, the second step-up circuit and the second holding current output circuit drive the solenoid corresponding to the first cylinder, at the time of main injection and drive the solenoid, corresponding to the second cylinder which injects fuel next after the first cylinder, at the time of pilot injection, and the driving at the time of each of the injections is repeated, and the plurality of switching means execute the switching from/to the outputs of the first step-up circuit and the first holding current output circuit at the time of pilot injection to/from outputs of the second step-up circuit and the second holding current output circuit at the time of main injection, or the switching from/to the outputs of the first step-up circuit and the first holding current output circuit at the time of main injection to/from the outputs of the second step-up circuit and the second holding current output circuit at the time of pilot injection.

According to the aforesaid configuration, the set of the first step-up circuit and the first holding current output circuit and the set of the second step-up circuit and the second holding current output circuit alternate pilot injection and main injection, and change their charge of pilot injection and main injection every time the injection cylinders are changed. Thus, a load current of each solenoid valve at the time of pilot injection and main injection can promptly rise with each respective set of step-up circuit and holding current output circuit. At this time, there is enough time before the next injection timing so that the storage of energy can be performed without increasing the current capacity of an element of each step-up circuit as compared with the conventional one. Consequently, there no longer arises a delay in the response of the solenoid valves, and the timing and the quantity of fuel injection can be precisely controlled, thereby certainly reducing the concentration of $NO_x$ or the noise. Besides, the two sets can be composed identically. Therefore, if two sets of driving circuits, provided with identical step-up circuits and identical holding current output circuits respectively, are used, each set can be used as a back up at the time of a malfunction, since the two sets are interchangeable.

In addition, it is possible that the plurality of step-up circuits include a first step-up circuit and a second step-up circuit and the holding current output circuit includes a first holding current output circuit and a second holding current output circuit, wherein the first step-up circuit drives each of the solenoids in the fuel injectors corresponding to respective cylinders in the internal combustion engine at the time of pilot injection, the second step-up circuit drives, at a time of main injection, the same solenoid that was driven at the time of the pilot injection, the first holding current output circuit sends a holding current to the same solenoid at the times of pilot injection and main injection, and this is repeated for every other cylinder in a cylinder sequence to send the holding current, the second holding current output circuit sends a holding current to the same solenoid at the times of pilot injection and main injection and this is repeated, alternately with the first holding current output circuit, to send a holding current to every other cylinder in the cylinder sequence, and the plurality of switching means switch respective outputs of the first step-up circuit, the first holding current output circuit, the second step-up circuit, and the second holding current output circuit, and the switching is conducted to allow a part of the period of holding current at the time of a main injection and a part of the period of holding current at the time of a pilot injection to overlap each other.

According to the aforesaid configuration, independent holding current output circuits and switching means are provided so as to send a holding current to each of the solenoids corresponding to respective cylinders when an initial part and a last part of the injection periods of the respective cylinders overlap each other. Therefore, it becomes possible to deal with the case wherein the engine speed increases and the injection periods of the respective cylinders overlap. Consequently, the timing and the quantity of pilot injection and main injection can be precisely controlled, thus certainly reducing the concentration of $NO_x$ and the noise.

It is also possible that the plurality of step-up circuits include a first step-up circuit and a second step-up circuit, and that holding current output circuits are provided corresponding to the respective cylinders in the internal combustion engine, wherein the first step-up circuit drives each of the solenoids in the fuel injector corresponding to the respective cylinders at the time of pilot injection, the second step-up circuit drives, at the time of main injection, the same solenoid that was driven at the time of the pilot injection, the holding current output circuits, corresponding to the respective cylinders, exclusively drive the respective solenoids relative to the respective cylinders, and the plurality of switching means switches respective outputs of said first step-up circuit, the second step-up circuit, and the holding current output circuits relative to the respective cylinders, and the switching is conducted to allow a part of the period of holding current at the time of a main injection and a part of the period of holding current at a time of pilot injection to overlap each other.

According to the aforesaid configuration, an exclusive holding current output circuit and a switching means for independently sending a holding current are provided relative to each cylinder so as to send the holding current to each of the solenoids corresponding to the respective cylinders when an initial part and a last part of the injection periods of the respective cylinders overlap. Therefore, it becomes possible to deal with the case wherein the engine speed increases and the injection periods of the respective cylinders overlap each other. Consequently, the timing and the quantity of pilot injection and main injection can be precisely controlled, thus certainly reducing the concentration of $NO_x$ and noise.

In addition, it is possible that the plurality of step-up circuits include a first step-up circuit and a second step-up circuit, and that the holding current output circuits are provided corresponding to the respective cylinders in the internal combustion engine, wherein the first step-up circuit drives a solenoid in the fuel injector, corresponding to a first cylinder in the internal combustion engine, at the time of pilot injection and drives a solenoid, corresponding to a second cylinder which injects fuel next after the first cylinder, at the time of main injection, and the driving at the time of each of the injections is repeated, the second step-up circuit drives the solenoid, corresponding to the first cylinder, at the time of main injection and drives the solenoid, corresponding to the second cylinder which injects fuel next after the first cylinder, at the time of pilot injection, and the driving at the time of each of the injections is repeated, the holding current output circuits corresponding to the respective cylinders exclusively drive the respective solenoids relative to the respective cylinders, and the plurality of switching means execute the switching from/to an output of the first step-up circuit at the time of pilot injection and to/from an output of the second step-up circuit at the time of main injection, and the switching of outputs of the holding current output circuits relative to the respective cylinders, or execute the switching from/to an output of the first step-up circuit at the time of main injection to/from an output of the second step-up circuit at the time of pilot injection, and the switching of outputs of the holding current output circuits relative to the respective cylinders, and the switching is conducted to allow a part of the period of holding current at the time of a main injection and a part of the period of holding current at the time of a pilot injection to overlap each other.

According to the aforesaid configuration, the first step-up circuit and the second step-up circuit alternate pilot injection and main injection and change their charge of pilot injection and main injection every time the injection cylinders are changed. Besides, similarly to the above, when an initial part and a last part of the injection periods of the respective cylinders overlap each other, a holding current can be sent to each of the solenoids. Therefore, it becomes possible to deal with the case where the injection periods of the respective cylinders overlap each other.

Moreover, it is possible that the plurality of step-up circuits include a first step-up circuit and a second step-up circuit, and the holding current output circuit includes a first holding current output circuit and a second holding current output circuit, that the first step-up circuit and the first holding current output circuit drive a solenoid in the fuel injector, corresponding to a first cylinder in the internal combustion engine, at the time of pilot injection and drive a solenoid, corresponding to a second cylinder which injects fuel next after the first cylinder, at the time of main injection, and the driving at the time of each of the injections is repeated, that the second step-up circuit and the second holding current output circuit drive the solenoid, corresponding to the first cylinder, at the time of main injection and drive the solenoid, corresponding to the second cylinder which injects fuel next after the first cylinder, at the time of pilot injection, and the driving at the time of each of the injections is repeated, and that the plurality of switching means execute the switching from/to the outputs of the first step-up circuit and the first holding current output circuit at the time of pilot injection to/from the outputs of the second step-up circuit and the second holding current output circuit at the time of main injection, or execute the switching from/to the outputs of the first step-up circuit and the first holding current output circuit at the time of main injection to/from outputs of the second step-up circuit and the second holding current output circuit at the time of pilot injection, and the switching is conducted to allow a part of the period of holding current at the time of main injection and a part of the period of holding current at the time of pilot injection to overlap each other.

According to the aforesaid configuration, the first step-up circuit and the second step-up circuit alternate pilot injection and main injection and change their charge of pilot injection and main injection every time the injection cylinders are changed. Besides, two holding current output circuits which alternately drive a holding current every time the injection cylinders are changed and switching means for independently sending the holding current are provided so as to send a holding current to each of the solenoids when an initial part and a last part of the injection periods of the respective cylinders overlap each other. Therefore, it becomes possible to deal with the case wherein the injection periods of the respective cylinders overlap each other. Consequently, the timing and the quantity of pilot injection and main injection can be precisely controlled.

Further, one holding current output circuit can be employed as both the first holding current output circuit and the second holding current output circuit, and this one common holding current output circuit can drive a holding current at the time of pilot injection and at the time of main injection. According to this configuration, one holding current output circuit is commonly used as a holding current output circuit for pilot injection and as a holding current output circuit for main injection to thereby drive a holding current. Thus, the configuration of the whole driving circuit is simplified and further decreased in size and in cost.

Furthermore, the inductive load can be the phase coils in a step motor. According to this configuration, in an equivalent polyphase driving system of the step motor, an exciting current of each phase coil is set at a plurality of levels to thereby allow a load current to promptly rise responsive to step-up circuits which are separately provided in relation to the respective levels. Accordingly, there no longer arises a delay in current at the time of switching at each current level, thus improving the responsiveness of equivalent polyphase driving. Consequently, even if the rotation of the step motor is speeded up, the responsiveness can be maintained high and the motor can stably operate.

It is possible that the plurality of step-up circuits include a first step-up circuit and a second step-up circuit, that the first step-up circuit, for allowing an exciting current at a first level to rise at high speed, the second step-up circuit, for allowing an exciting current at a second level to rise at high speed, and the holding current output circuit, for holding the exciting current at the first and the second levels, are provided relative to each of the phase coils in the step motor, and that the plurality of switching means switches the respective outputs of the first step-up circuit, the second step-up circuit, and the holding current output circuit.

According to the aforesaid configuration, the current level of each phase in the step motor is set at two levels; the respective step-up circuits, for allowing load currents to rise at high speed at the two current levels, are provided; and the holding current output circuit, for holding constant currents corresponding to the two current levels, is provided. Thus, a load current corresponding to each current level can promptly rise responsive to each step-up circuit. There no longer arises a delay in the current at the time of switching at each current level, thereby improving the responsiveness of the equivalent polyphase driving. Consequently, even if the rotation of the step motor is speeded up, the responsiveness can be maintained high and the motor can stably operate.

It is also possible that the level of each phase current is set at a plurality of levels in the step motor, that the plurality of step-up circuits are provided relative to each phase coil in the step motor and allow an exciting current to rise at high speed at each level of the plurality of levels, and that the holding current output circuit holds an exciting current at each level of the plurality of levels.

According to the aforesaid configuration, the current level of each phase in the step motor is set at a plurality of levels; a plurality of step-up circuits, for allowing load currents to rise at high speed at the plurality of current levels respectively, are provided; and the holding current output circuit, for holding constant currents corresponding to the plurality of current levels, is provided. Thus, a load current corresponding to each current level can promptly rise responsive to each step-up circuit. There no longer arises a delay in the current at the time of switching at each current level, thereby improving the responsiveness of the equivalent polyphase driving. Consequently, even if the rotation of the step motor is speeded up, the responsiveness can be maintained high and the motor can stably operate.

An inductive load driving method according to the present invention is an inductive load driving method in which the same inductive load is driven a plurality of times within a predetermined period of time and the driving is executed repeatedly, characterized by including the steps of:

stepping up a voltage to a high voltage, to be applied by a respective one of different step-up circuits, each time at the time of rise of an initial load current, and holding a holding current each time by either the same holding current circuit or different holding current circuits.

According to the aforesaid method, when the same inductive load is driven a plurality of times within a predetermined period of time, a high voltage at an initial stage of driving is applied each time separately by each of a plurality of step-up circuits. At this time, ample energy can be stored with time to spare by the time when each step-up circuit is next required to apply a high voltage, whereby there no longer arises a delay in the response of the inductive load. Since more time for storing the energy is provided, as compared with the conventional case wherein an inductive load is driven a plurality of times by a single step-up circuit, the current capacity of each step-up circuit can be greatly decreased as compared with the conventional one. Accordingly, the step-up circuit can be decreased in size and in cost, and the reliability of the driving device is improved.

An inductive load driving method according to the present invention is an inductive load driving method in which the same inductive load is driven a plurality of times within a predetermined period of time and the driving is executed repeatedly, characterized by including the steps of:

storing high-voltage energy in each of a plurality of capacitors from one inductive circuit through a respective one of rectifying devices, applying the high-voltage energy, stored in a respective one of the capacitors, each time at the time of rise of an initial load current, holding a holding current each time by either the same holding current circuit or different holding current circuits, and speeding up each rise of a current which is sent to the same inductive load a plurality of times within a predetermined period of time.

According to the aforesaid method, when the same inductive load is driven a plurality of times within a predetermined period of time, high-voltage energy is stored in each of the plurality of capacitors from one inductive circuit through a respective one of the rectifying devices, and a high voltage at an initial stage of driving is applied from a respective capacitor each time. At this time, ample energy can be stored with time to spare by the time when each capacitor is next required to apply a high voltage, whereby there no longer arises a delay in the response of the inductive load. Since the time for storing the energy is greater, as compared with the conventional case wherein an inductive load is driven a plurality of times by a single step-up circuit, the current capacity of each step-up circuit can be greatly decreased as compared with the conventional one. Accordingly, the step-up circuit can be decreased in size and in cost, and the reliability of the driving device is improved.

BRIEF DESCRIPTION OF THE DRAWINGS

FIG. 2A and FIG. 2B are block diagrams of an inductive load driving device in the first embodiment according to the present invention, wherein FIG. 2A shows first and second driving circuits and solenoid valves, and FIG. 2B shows an initial driving signal output unit and a driving signal processing output unit;

FIG. 7A and FIG. 7B are block diagrams of an inductive load driving device a second embodiment according to the present invention, wherein FIG. 7A shows first and a second driving circuits and solenoid valves, and FIG. 7B shows an initial driving signal output unit and a driving signal processing output unit;

FIG. 16 is a block diagram of an inductive load driving device in a seventh embodiment according to the present invention;

FIG. 17 is a timing chart of respective signals in the seventh embodiment according to the present invention;

BEST MODE FOR CARRYING OUT THE INVENTION

Preferable embodiments of the present invention will be described in detail below with reference to the attached drawings. FIGS. 1 to 17 show examples of the driving of solenoid valves in a fuel injector of a diesel engine.

Figure 1:
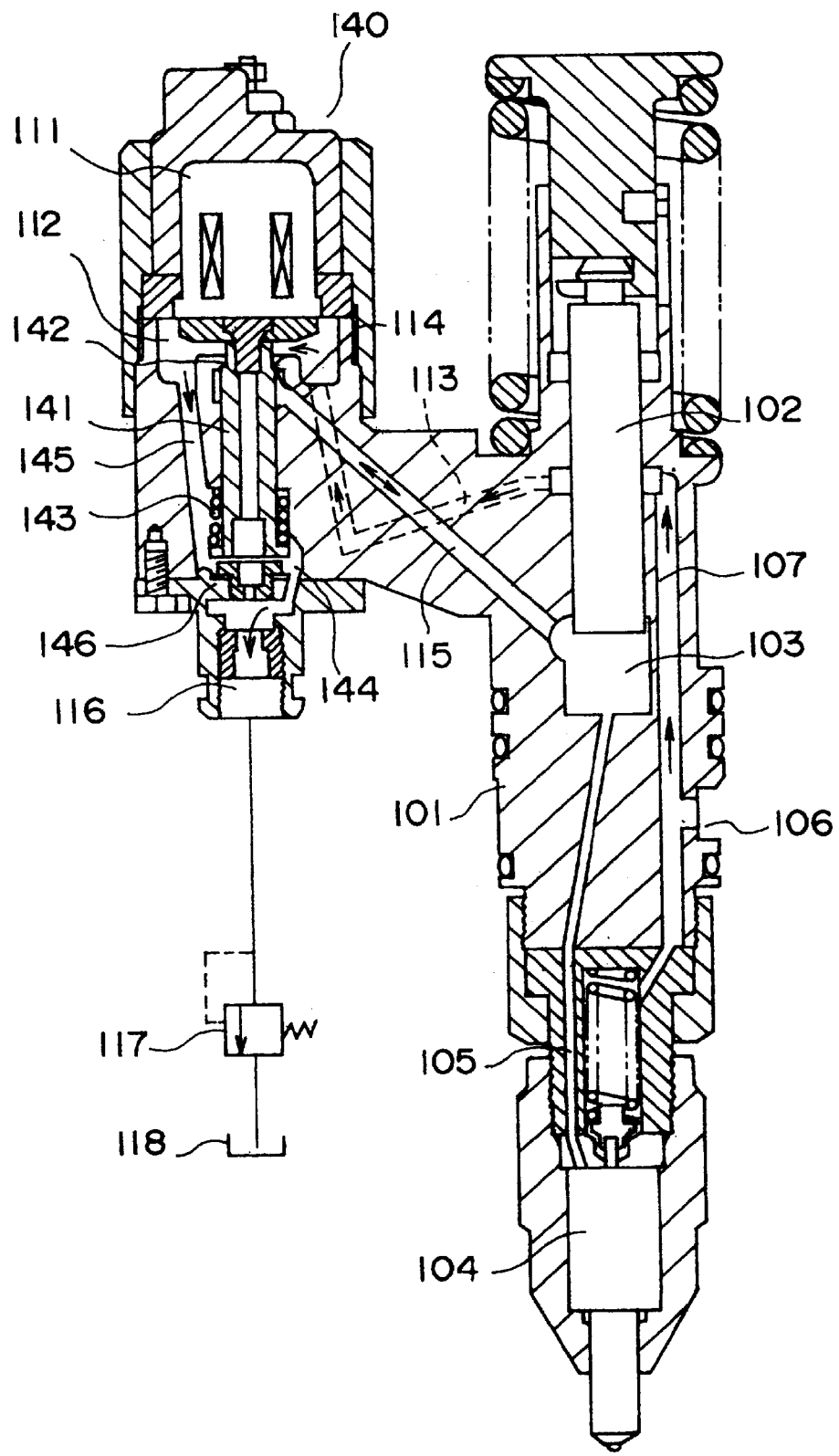
FIG. 1 is a sectional view of an electronically controlled solenoid valve type unit fuel injector in a first embodiment according to the present invention.

FIG. 1 shows a first embodiment in which a respective unit fuel injector is provided in each respective cylinder. A plunger 102, which executes a reciprocating motion responsive to a cam not shown, is positioned in a pressure chamber 103, which is formed in a nozzle holder 101. An injection nozzle 104 is attached to a forward end of the nozzle holder 101, and communication between the pressure chamber 103 and the injection nozzle 104 is provided by an injection fuel circuit 105. A fuel inlet 106 is provided in a side face of the nozzle holder 101, and fuel is supplied to the fuel inlet 106 from a fuel feed pump (not shown). A fuel supply circuit 107 communicating with the fuel inlet 106 is disposed within the nozzle holder 101.

A solenoid valve 140, having a solenoid 111, is disposed in the upper portion of the nozzle holder 101; and a valve 141, having a seat 142, is disposed so as to be vertically movable below the solenoid 111. An armature chamber 112 is provided at the lower portion of the solenoid 111, and communicates with the fuel supply circuit 107 through a low pressure fuel circuit 113. A high pressure fuel circuit 115 abuts on the seat 142 via a valve seat 114, and the armature chamber 112 communicates with the pressure chamber 103 via the valve 141 and the high pressure fuel circuit 115. The valve 141 is resiliently biased by a return spring 143 in the direction in which a space between the valve seat 114 and the seat 142 is opened, and the return position of the valve 141 is regulated by a stopper 146. A spill chamber 144, communicating with the armature chamber 112 via a circuit 145, is connected to an oil pan 118 via a spill circuit 116 and a pressure control valve 117. The pressure control valve 117 controls the flow of fuel so as to have a pressure in the range of 5 Kg/cm$^2$ to 8 Kg/cm$^2$.

The operation of the unit fuel injector with the aforesaid configuration will be explained hereinafter. When the solenoid 111 is not operated, the valve 141 is resiliently biased downwardly by the return spring 143, and the space between the valve seat 114 and the seat 142 is opened. Fuel, supplied from the feed pump (not shown), enters the armature chamber 112 via the fuel inlet 106, the fuel supply circuit 107, and the low pressure fuel circuit 113, and returns to the oil pan 118 via the circuit 145, the spill chamber 144, the spill circuit 116, and the pressure control valve 117. At this time, the pressure is controlled at a low pressure in the range of 5 Kg/cm$^2$ to 8 Kg /cm$^2$ by the pressure control valve 117. Part of the fuel in the armature chamber 112 fills the pressure chamber 103 by way of the high pressure fuel circuit 115 after passing through the space between the valve seat 114 and the seat 142.

When the solenoid 111 is operated, the valve 141 is pulled upwardly so that the space between the seat 142 and the valve seat 114 is closed. The plunger 102 is pushed downwardly by the cam (not shown) so that the fuel in the pressure chamber 103 has a higher pressure to thereby be injected via the injection fuel circuit 105 and the injection nozzle 104 into the cylinder. When the operation of the solenoid 111 is stopped, the valve 141 is pushed downwardly by the return spring 143 so that the space between the seat 142 and the valve seat 114 is opened, and high pressure fuel escapes from the armature chamber 112 to the spill circuit 116, whereby the fuel pressure becomes lower and the fuel injection is completed. The timing and quantity of fuel injection is controlled by controlling the operating timing and period of the solenoid 111.

Figure 2A:
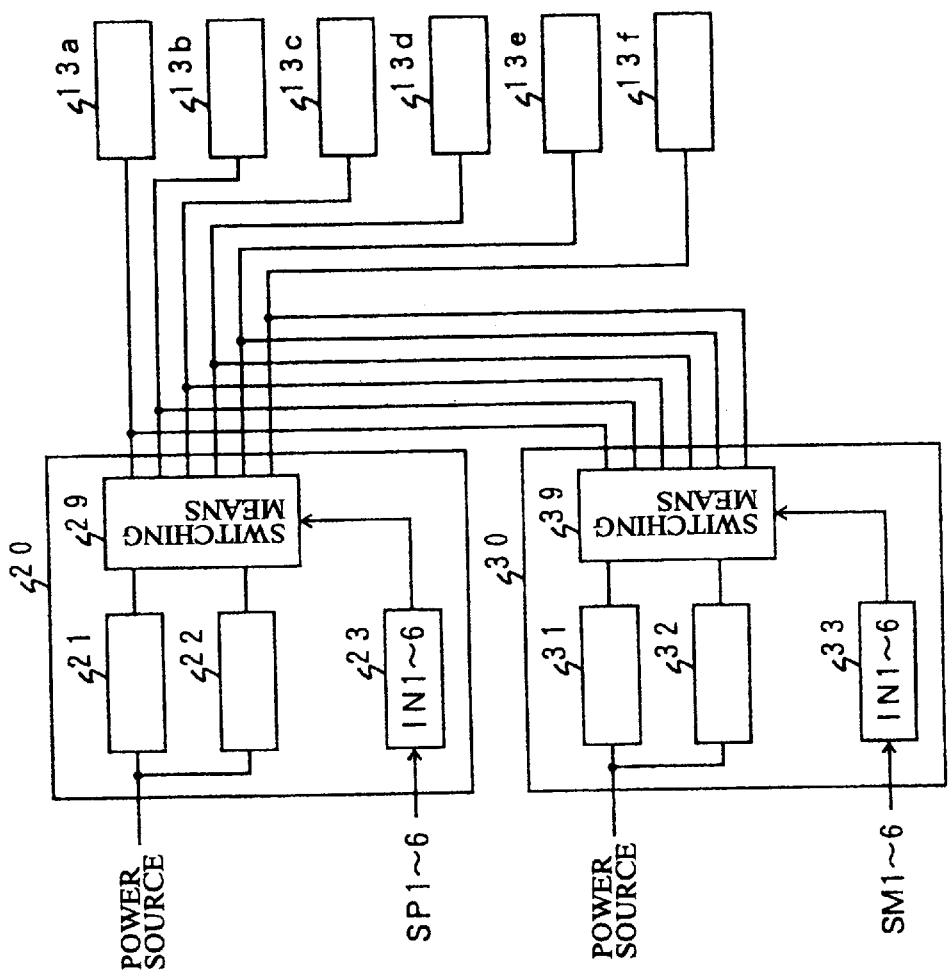
Figure 2B:
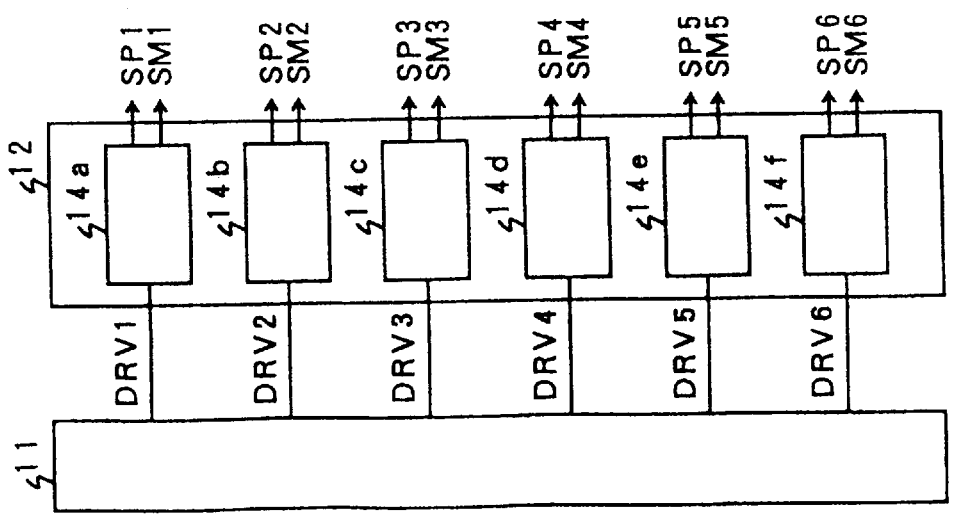

Explanation will be given with a six cylinder engine (not shown) in which an aforesaid unit fuel injector is provided for each cylinder. Specifically, each cylinder of the six cylinder engine (not shown) includes a solenoid valve 140, having the solenoid 111 such as is shown in FIG. 1. In FIGS. 2A and 2B, an initial driving signal output unit 11 outputs a sequential injection command signal DRVn (n=1 to 6) for each of the solenoid valves 13a through 13f which correspond to the respective cylinders, to a driving signal processing output division 12 in synchronization with the rotation of the engine and in accordance with a predetermined injection cylinder sequence. Here, the solenoid valves 13a through 13f denote the aforesaid six solenoid valves 140, each having a solenoid valve 111. Next, the operation of each solenoid 111, including the operation of the solenoid valves 13a to 13f, will be explained. Incidentally, although the explanation will be given for the six cylinder engine, the number of cylinders is not limited. Signal distributors 14a through 14f, corresponding to the respective solenoid valves 13a through 13f, are provided in the driving signal processing output unit 12. Each of the signal distributors 14a through 14f generates a driving signal SPn (n=1 to 6), for commanding a pilot injection, and a driving signal SMn (n=1 to 6), for commanding a main injection, based on the sequential injection command signal DRVn, and outputs these driving signals SPn and SMn to a first driving circuit 20 and a second driving circuit 30, respectively.

The first driving circuit 20 and the second driving circuit 30 drive each of the solenoid valves 13a to 13f to thereby execute a pilot injection and a main injection, respectively. The first driving circuit 20 and the second driving circuit 30 have the same configuration, and include therein step-up circuits 21 and 31, holding current output circuits 22 and 32, control logic circuits 23 and 33, and switching means 29 and 39, respectively. The control logic circuits 23 and 33 activate the switching means 29 and 39 to switch the outputs of the step-up circuits 21 and 31 and the holding current output circuits 22 and 32, to thereby output a predetermined voltage to the output line corresponding to the respective one of the solenoid valves 13a through 13f. The output lines corresponding to the respective solenoid valves of the first and second driving circuits 20 and 30 are connected to the respective solenoid valves in parallel.

Figure 3:
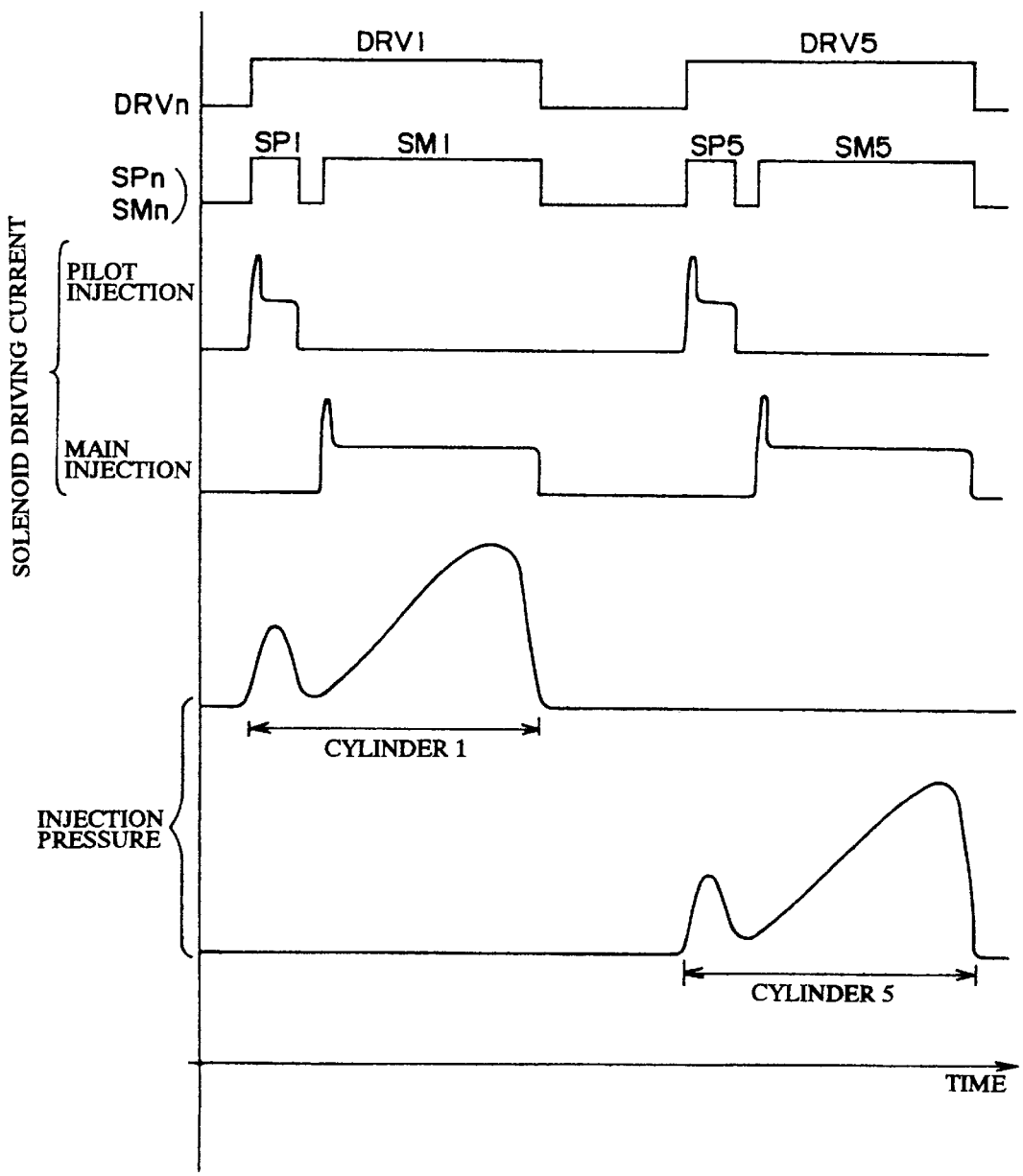
FIG. 3 is a timing chart of each signal in the first embodiment according to the present invention.

In FIG. 3, while the driving signal SPn is inputted, the first driving circuit 20 sends a driving current to the solenoid valve, which corresponds to the driving signal SPn, to thereby pilot-inject fuel. Consequently, the injection pressure increases slightly, and initial combustion is executed. While the driving signal SMn is inputted, the second driving circuit 30 sends a driving current to the solenoid valve which corresponds to the driving signal SMn, to thereby main-inject fuel. Consequently, the injection pressure increases gently, and main combustion is executed.

The first driving circuit 20 will be explained with FIG. 4. The step-up circuit 21 is supplied with energy from a power source (namely, an on-vehicle battery) and stores the energy in a capacitor 24 within a predetermined period of time to thereby generate a predetermined high voltage. The capacitor 24 is connected to the respective input terminals of the switching means 25a through 25f, and the respective output terminals of the switching means 25a through 25f are connected to the anodes of the diodes 27a through 27f. The cathode sides of the respective diodes 27a through 27f are the output terminals OUT 1 through OUT 6, respectively, of the driving circuit. The holding current output circuit 22 supplies the load with a predetermined current at a lower voltage than the aforesaid high voltage and usually applies supply voltage directly. An open condition of the load, i.e., the solenoid valves, is maintained by the predetermined current. The output of the holding current output circuit 22 is connected to the respective input terminals of the switching means 26a through 26f, and the respective output terminals of the switching means 26a through 26f are connected to the anodes of the diodes 27a through 27f, respectively, similarly to the switching means 25a through 25f. Incidentally, the switching means 25a through 25f and the switching means 26a through 26f can be composed of semiconductor switches, for example, and a thyristor, FET, or the like, can be used as the switching means.

Figure 5:
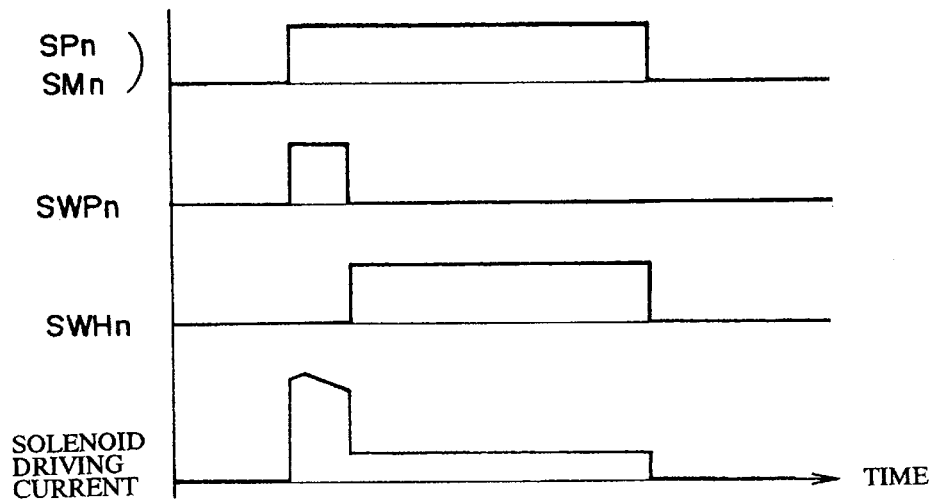
FIG. 5 is a signal timing chart of a control logic circuit in the first embodiment according to the present invention.

The control logic circuit 23 controls the opening and the closing of each of the switching means 25a through 25f and the switching means 26a through 26f. FIG. 5 is a timing chart of the signals where the control logic circuit 23 inputs the driving signal SPn for commanding a pilot injection corresponding to a respective solenoid valve and generates a high voltage applying command SWPn and a holding voltage applying command SWHn. After generation, the control logic circuit 23 outputs the high voltage applying command SWPn to a control input terminal of the corresponding one of the switching means 25a through 25f, and outputs the holding voltage applying command SWHn to a control input terminal of the corresponding one of the switching means 26a through 26f. When receiving the high voltage applying command SWPn, the corresponding one of the switching means 25a through 25f is electrified and supplies the high voltage energy in the capacitor 24 to the corresponding one of the solenoid valves 13a through 13f. When receiving the holding voltage applying command SWHn, the corresponding one of switching means 26a through 26f is electrified and sends a predetermined holding current to the corresponding one of the solenoid valves 13a through 13f. As a result, the initial driving current of a solenoid valve rises at a high speed and the pilot injection of fuel is executed with good response. Incidentally, when a thyristor, FET, or the like is used as a switching means, the aforesaid high voltage applying command SWPn and the holding voltage applying command SWHn signal are inputted to a gate terminal of such a semiconductor switch.

The configuration of the second driving circuit 30 is the same, which is composed of the step-up circuit 31, the holding current output circuit 32, the control logic circuit 33, a capacitor 34, switching means 35a through 35f, switching means 36a through 36f, and diodes 37a through 37f. However, since an output period of a holding current for a main injection is usually longer than that for a pilot injection, the average output tolerance amount (thermal capacity) of the holding current Output circuit necessarily needs to be increased more in the holding current output circuit 32 for a main injection. Thus, in consideration of economical effectiveness, the capacity of the holding current output circuit 22 for pilot injection can be decreased.

The control logic circuit 33 inputs the driving signal SMn corresponding to a respective solenoid valve, generates the high voltage applying command SWPn and the holding voltage applying command SWHn similar to those described above, outputs the high voltage applying command SWPn to a control input terminal of the corresponding one of the switching means 35a through 35f, and outputs the holding voltage applying command SWHn to a control input terminal of the corresponding one of the switching means 36a through 36f. When receiving the high voltage applying command SWPn, the respective one of the switching means 35a through 35f is electrified and supplies the high voltage energy in the capacitor 24 to the corresponding one of the solenoid valves 13a through 13f. When receiving the holding voltage applying command SWHn, the corresponding one of the switching means 36a through 36f is electrified and sends a predetermined holding current to the corresponding one of the solenoid valves 13a through 13f. As a result, the initial driving current of the solenoid valve rises at a high speed, and a main injection of fuel is executed with good response.

Since the first driving circuit 20 is exclusively used for pilot injection and the second driving circuit 30 is exclusively used for main injection, as described above, a high voltage can be applied to the solenoid valves 13a through 13f, corresponding to the respective cylinders, by the step-up circuits which are disposed independently in respective driving circuits, even when the time interval between the pilot injection timing and the main injection timing is short. The time interval required for storing energy in the capacitor 24 of each step-up circuit is set to be enough in consideration of the injection time interval among the respective cylinders at the maximum engine speed, whereby the voltage is certainly stepped up for the cylinder to be injected next. Accordingly, the load currents of the solenoid valves 13a through 13f of the respective cylinders promptly rise every time, and thus both a pilot injection and a main injection are executed with good responsiveness. The average output tolerance amount (thermal capacity) of each driving circuit at this time decreases substantially as compared with that of a driving circuit provided with an element with a large capacity which a enables step-up in voltage within a short time; hence, the whole configuration is decreased in size, and the costs are not sharply increased. In addition, the thermal capacity of the driving circuits is decreased, thereby improving the reliability.

The reason the driving circuits 20 and 30 according to the present invention are decreased in size and the reliability is improved as described above will be explained below.

Figure 6:
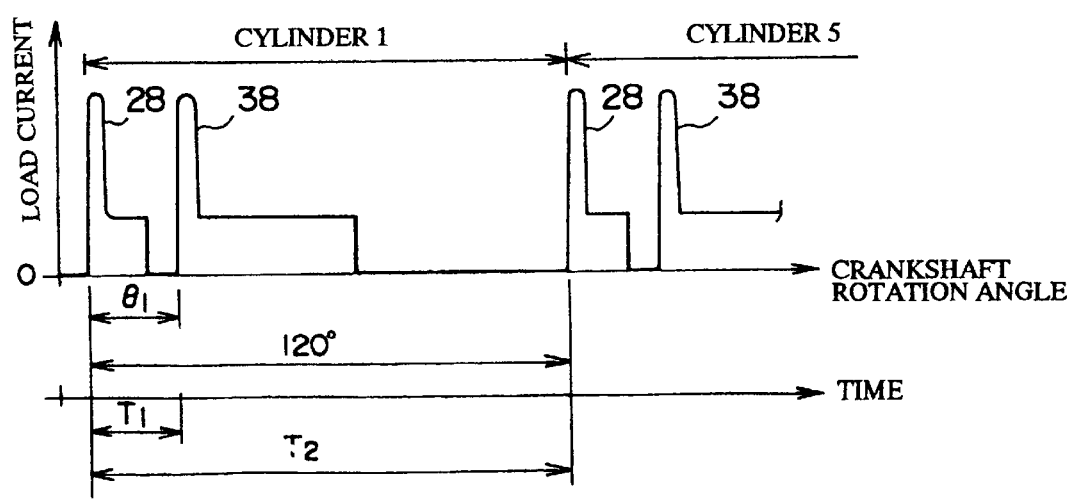
FIG. 6 is a diagram explaining the time interval between a pilot injection and a main injection relative to each cylinder in the first embodiment according to the present invention.

In FIG. 6, the horizontal axis represents a rotation angle of a crankshaft of an engine or an equivalent time to the rotation angle, and the vertical axis represents a load current value of each of the solenoid valves 13a through 13f. The number of cylinders shows an injection order, and injections into the first cylinder and the fifth cylinder are representatively shown in FIG. 6. In each cylinder, a load current 28 at the time of pilot injection and a load current 38 at the time of main injection are passed at a predetermined crank rotation angle. The crankshaft rotation angle among the respective cylinders are, for example, 120° in a six cylinder engine, and when the engine is rotating at a predetermined engine speed, the rotation of 120° requires a predetermined period of time T2. A crank rotation angle between the rise of a pilot injection and the rise of a main injection in each cylinder at this time is represented by θ1 and the period of time required is represented by T1.

When driving is conducted by one driving circuit, that is, when a pilot injection and a main injection are executed by a single step-up circuit 21 and one holding current output circuit 22, the step-up in voltage must be completed for the main injection at least within the period of time T1. If energy (energy required for quickly operating the solenoid valves) to be stored in the capacitor 24 is represented by A(J) in this case, the necessary output of the step-up circuit 21 is expressed by the equation "W1(W)=A(J)/T1" with its efficiency as 100%. In contrast, when the pilot injection and the main injection are divided between two separate driving circuits as shown in the present embodiment, the step-up in voltage needs to be completed within the period of time T2 for the next pilot injection or main injection. Accordingly, the required output of the step-up circuit 21 at this time is expressed by the equation "W2(W)=A(J)/T2" with its efficiency as 100%. Thus, the ratio of efficiency in the above two cases is expressed by the equation "W2/W1=T1/T2".

Supposing the above crank rotation angle θ1 is 30 and the engine speed is 1000/rpm, for example, the period of time T1 is 0.5 ms and the period of time T2 is 20 ms. Therefore, the ratio of efficiency in the above two cases at this time is expressed by the equation "W2/W1=1/40" from the above equation. Moreover, a charging current "W1/V" or "W2/V" needs to be sent respectively in order to execute the above outputs at a predetermined constant supply voltage (for example, a battery voltage of 24V) within the predetermined period of time T1 or T2. Hence, the maximum current value of the step-up circuit 21 in the present embodiment is 1/40 as compared with a conventional one. Consequently, when the pilot injection and the main injection are divided between two separate driving circuits, the required current capacity of each driving circuit decreases drastically. Thus, the current capacity of each element of the step-up circuit, which gives energy to the capacitors 24 and 34, does not need to be increased, thereby decreasing the configuration in size and improving the reliability in the element. The above is the reason that the configuration as a whole decreases more in size and the reliability can be improved when two sets of driving circuits which are decreased in size are used, which is the same in common inductive load driving.

Figure 7A:
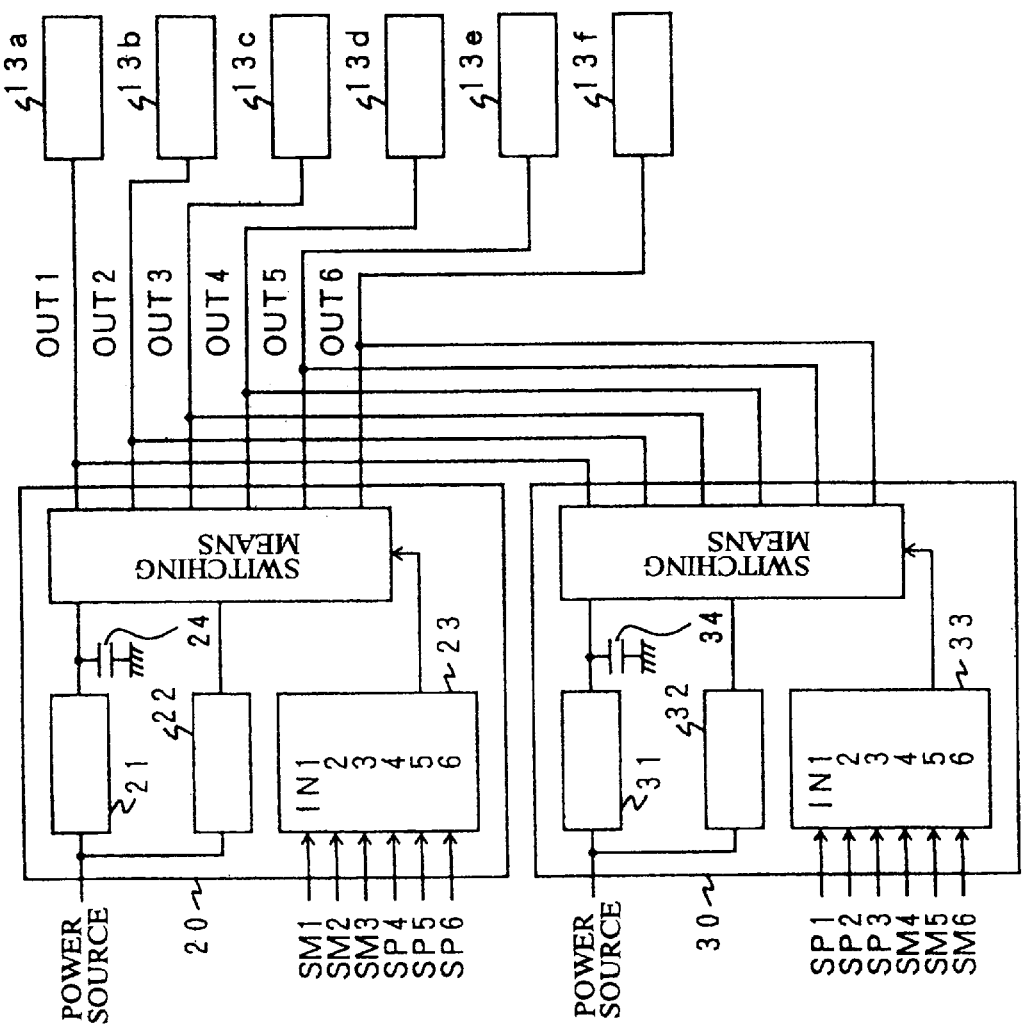
Figure 7B:
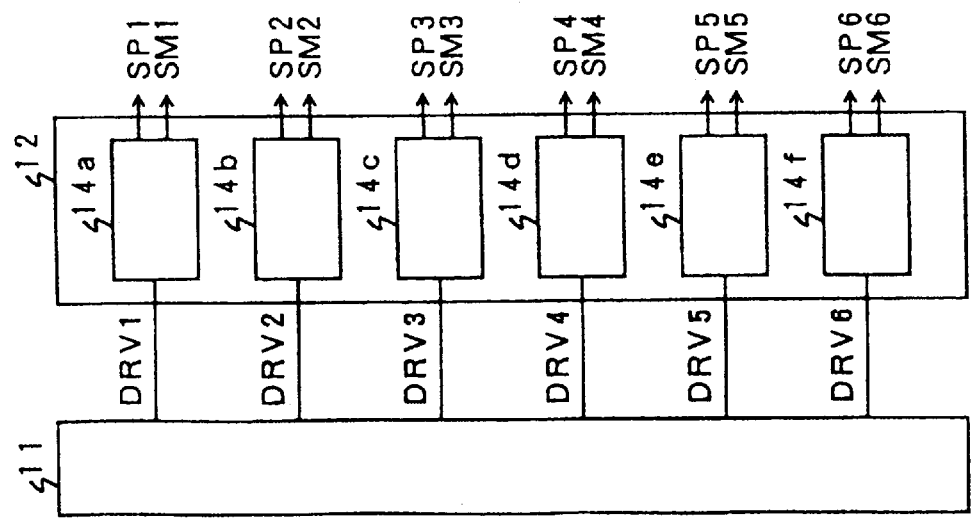

Next, a second embodiment will be explained based on FIGS. 7A and 7B. The second embodiment shows a method in which two driving circuits alternate the pilot injection and the main injection without exclusively taking charge of the pilot injection or the main injection.

Figure 4:
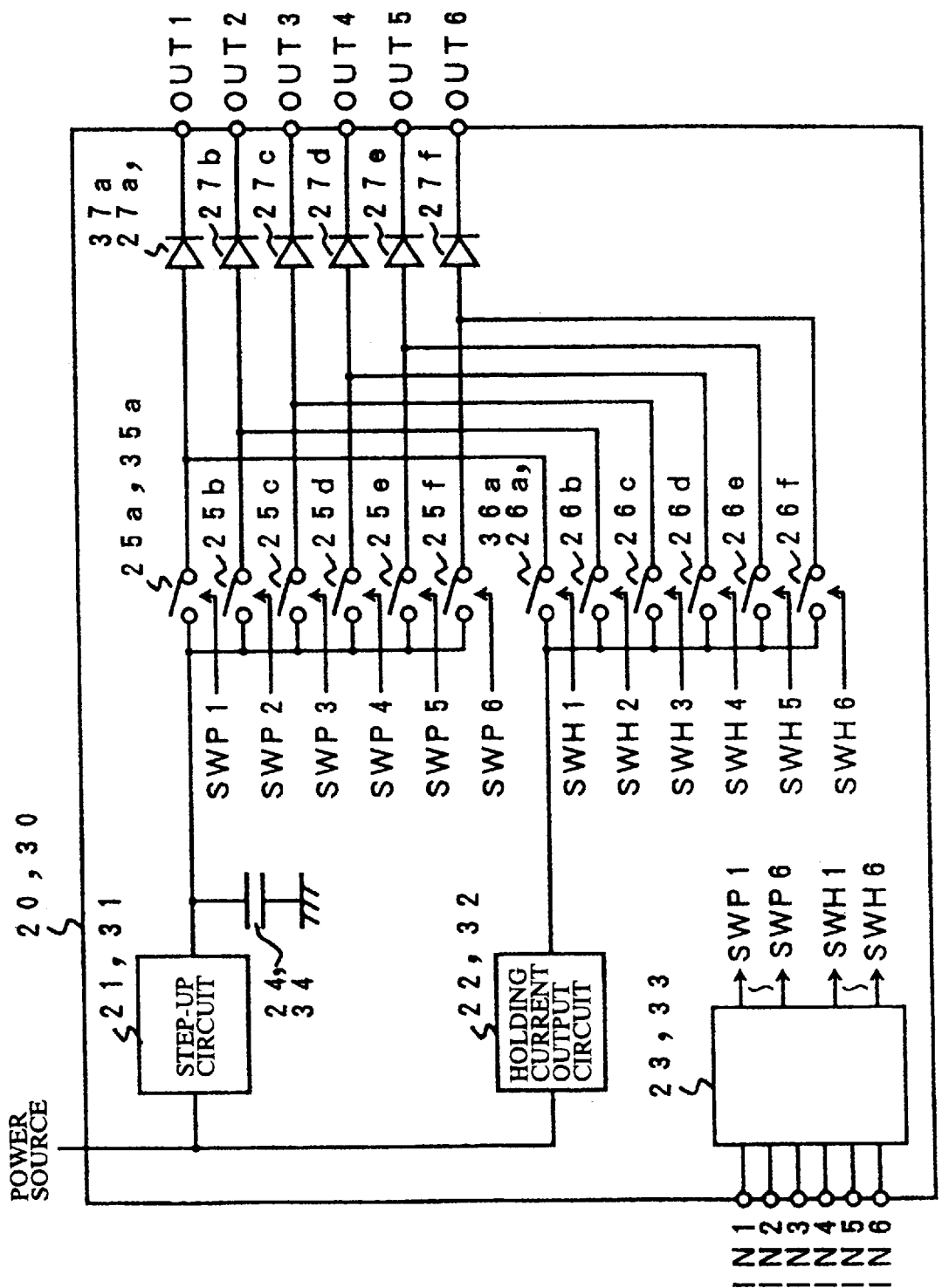
FIG. 4 is a circuit block diagram of a driving circuit in the first embodiment according to the present invention.

The internal configurations of the first and the second driving circuits 20 and 30 are the same as those shown in FIG. 4. Each of the signal distributors 14a through 14f in the driving signal processing output unit 12 generates a driving signal SPn for commanding the pilot injection and a driving signal SMn (n=1 to 6) for commanding the main injection, based on the sequential injection command signal DRVn from the initial driving signal output unit 11. The respective driving signal SPn and the respective driving signal SMn correspond to respective ones of the solenoid valves 13a to 13f of the respective cylinders and are inputted to the control logic circuits 23 and 33 so that the first driving circuit 20 and the second driving circuit 30 alternately execute the pilot injection and the main injection. Specifically, when the respective cylinders are C1 to C6 and the injection order of cylinders is C1→C5→C3→C6→C2→C4→C1, a driving signal SP1, driving signals SM1 and SP5, and driving signals SM5 and SP3 are alternately inputted to the second driving circuit 30, the first driving circuit 20, and the second driving circuit 30, respectively. The final driving signal SM4 is inputted to the second driving circuit 30 in the same way as the above.

The timing chart of the respective signals in this embodiment is the same as that in FIG. 3, and the operation will be explained with reference to FIG. 3, FIG. 4, FIG. 7A, and FIG. 7B. For example, a sequential injection command signal DRV1 is an injection command for the first cylinder C1 and is outputted at a predetermined injection timing in synchronization with the rotation of the crankshaft. Driving signals SP1 and SM1, generated based on the sequential injection command signal DRV1, are inputted to the second driving circuit 30 and the first driving circuit 20, respectively.

In FIG. 4, in the second driving circuit 30, after inputting the driving signal SP1 to thereby generate a high voltage applying command SWP1 and a holding voltage applying command SWH1, the control logic circuit 33 outputs the high voltage applying command SWP1 to the switching means 35a, and after a predetermined period of time, outputs the holding voltage applying command SWH1 to the corresponding switching means 36a. Thus, the switching means 35a supplies the solenoid valve 13a with the high voltage energy in the capacitor 34, and after a predetermined period of time, the switching means 36a sends a holding current to the solenoid valve 13a. As a result, the initial driving current of the solenoid valve 13a of the first cylinder C1 promptly rises, and a pilot injection of fuel is executed with good response.

In the first driving circuit 20, after inputting a driving signal SM1 to thereby generate the high voltage applying command SWP1 and the holding voltage applying command SWH1, the control logic circuit 23 outputs the high voltage applying command SWP1 to the switching means 25a, and after a predetermined period of time, outputs the holding voltage applying command SWH1 to the corresponding switching means 26a. Thus, the switching means 25a supplies the solenoid valve 13a with the high-voltage energy in the capacitor 24, and after a predetermined period of time, the switching means 26a sends a holding current to the solenoid valve 13a. As a result, the initial driving current of the solenoid valve 13a of the first cylinder C1 promptly rises and a main injection of fuel is executed with good response.

Next after the first cylinder C1, a sequential injection command signal DRV5 for the fifth cylinder C5 is outputted when the crankshaft is rotated to a predetermined angle. Driving signals SP5 and SM5, generated based on the sequential injection command signal DRV5, are inputted to the first and second driving circuits 20 and 30, respectively. In this case, the transfer of energy into the capacitor 24 of the first driving circuit 20 and into the capacitor 34 of the second driving circuit 30 is completed within the period from a point of time when the first cylinder C1 has finished injection to the above point of time.

In the first driving circuit 20, after inputting the driving signal SP5 to thereby generate a high voltage applying command SWP5 and a holding voltage applying command SWH5, the control logic circuit 23 outputs the high voltage applying command SWP5 to the switching means 25c, and after a predetermined period of time, outputs the holding voltage applying command SWH5 to the switching means 26e. Thus, similarly to the above, the initial driving current of the solenoid valve 13e of the fifth cylinder C5 promptly rises, and a pilot injection is executed with good response.

In the second driving circuit 30, after inputting the driving signal SM5 to thereby generate the high voltage applying command SWP5 and the holding voltage applying command SWH5, the control logic circuit 33 outputs the high voltage applying command SWP5 to the switching means 35e, and after a predetermined period of time, outputs the holding voltage applying command SWH5 to the switching means 36e. Thus, similarly, the initial driving current of the solenoid valve 13e of the fifth cylinder C5 promptly rises, and a main injection is executed with good response.

Next after the fifth cylinder C5, a sequential injection command signal DRV3 for the third cylinder C3 is outputted at a predetermined crankshaft rotation angle. Driving signals SP3 and SM3, generated based on the sequential injection command signal DRV3, are inputted to the second driving circuit 30 and the first driving circuits 20, respectively. In this case, similarly to the above, the transfer of energy into the capacitor 24 and into the capacitor 34 of the respective driving circuits is completed within the period from a point of time when the fifth cylinder C5 has finished injection to the above point of time. In the same way as the above, the initial driving current of the solenoid valve 13c of the third cylinder C3 promptly rises responsive to the second driving circuit 30, whereby a pilot injection is executed with good response, and the initial driving current of the solenoid valve 13c of the third cylinder C3 promptly rises responsive to the first driving circuit 20, whereby a main injection is executed with good response.

As described above, the first driving circuit 20 and the second driving circuit 30 alternate pilot injection and main injection, which allows the step-up circuits 21 and 31 to fully step up the voltage. Thus, the responsiveness of the solenoid valves at the time of each injection is improved, and there no longer exists a lag time in pilot injection and main injection, which enables the control of the appropriate $NO_x$ concentration, and in addition decreases each driving circuit in size and in cost, and improves the reliability. Incidentally, the first driving circuit 20 and the second driving circuit 30 can be composed of the same components in the present embodiment, which makes possible the mutual back-up at the time of a malfunction. In this case, the back-up can be made by driving the injection solenoid only through the use of the normal driving circuit.

Figure 8:
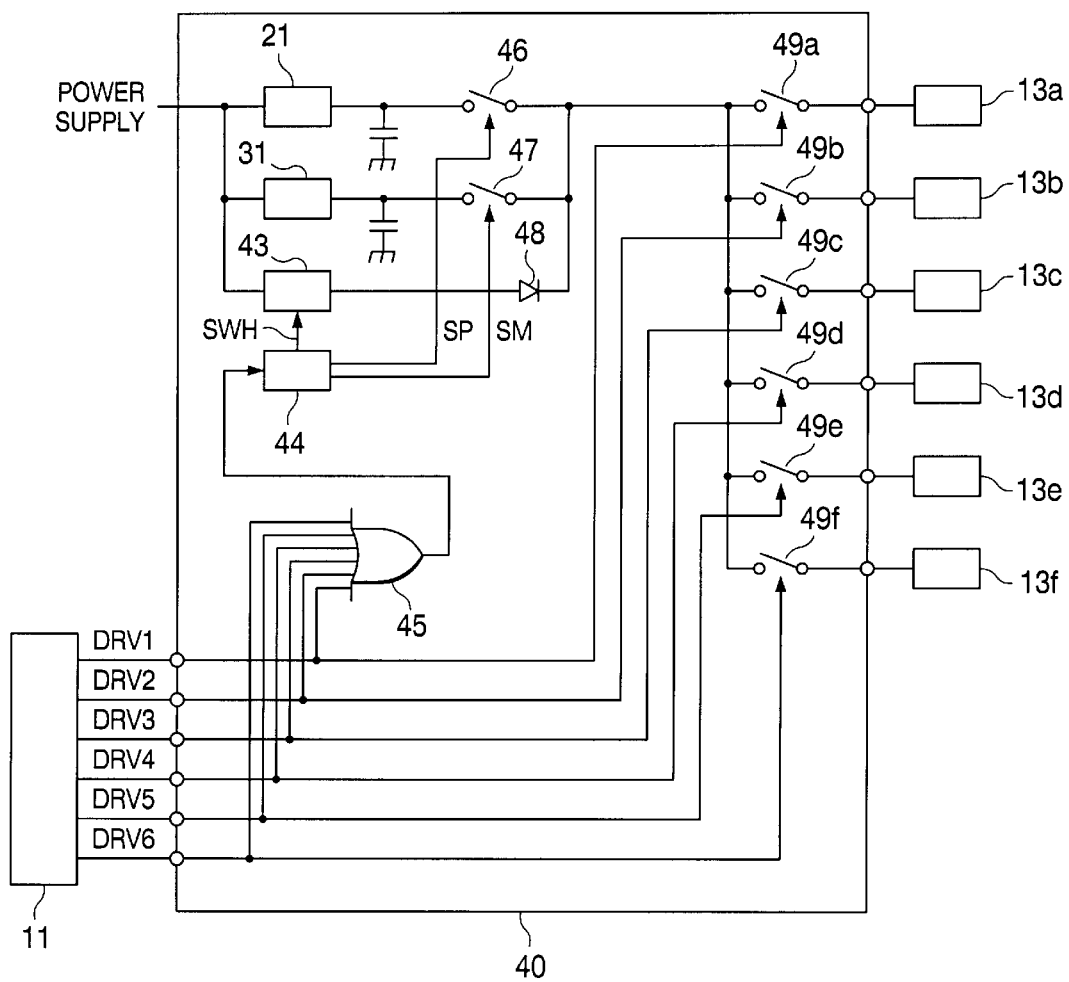
FIG. 8 is a block diagram of an inductive load driving device in a third embodiment according to the present invention.

Next, a third embodiment will be explained based on FIG. 8 and FIG. 9. The present embodiment, in which the driving circuit is composed with the aim of economical effect, is an example of a six-cylinder engine. The initial driving signal output unit 11 outputs the sequential injection command signal DRVn (n=1 to 6) similarly to the former embodiments. The sequential injection command signal DRVn is inputted to a single driving circuit 40.

Two step-up circuits 21 and 31 and one holding current output circuit 43 are provided in the driving circuit 40. The holding current output circuit 43 is almost the same as the holding current output circuit 22 in the former embodiments. The respective outputs of the step-up circuits 21 and 31 are connected to the switching means 46 and 47 via the capacitors 24 and 34. The output of the holding current output circuit 43 is connected to the anode of a diode 48. The respective output terminals of the switching means 46 and 47 and the cathode of the diode 48 are connected to each of the input terminals of the switching means 49a through 49f, and the output terminals of the respective switching means 49a through 49f are the output terminals of the driving circuit 40. Although the holding current output circuit 43 supplies a holding current similarly to the holding current output circuit 22, the holding current output circuit 43 outputs the holding current when inputting a holding voltage applying command from a control logic circuit 44. Incidentally, the switching means 46 and 47, and the switching means 49a through 49f can be composed of semiconductor switches or the like, similarly to the above.

A sequential injection command signal DRVn is inputted to the respective one of the gates of the switching means 49a through 49f and directly controls the opening and closing of each of the switching means 49a through 49f in synchronization with the injection timing for each cylinder. The sequential injection command signal DRVn is inputted to an OR circuit 45, and an output signal of the OR circuit 45 is inputted to the control logic circuit 44. The control logic circuit 44 outputs a predetermined control signal to the switching means 46 and 47 and to the holding current output circuit 43 based on the OR signal.

Figure 9:
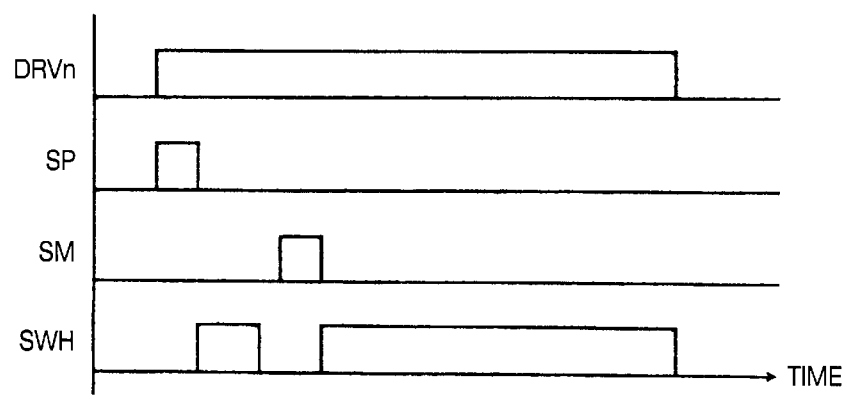
FIG. 9 is a timing chart of respective signals in the third embodiment according to the present invention.

In FIG. 9, the sequential injection command signal DRVn is outputted in synchronization with the injection timing for the respective cylinder. When the sequential injection command signal DRVn is turned ON, a corresponding one of the switching means 49a through 49f is electrified and a driving signal is outputted from the OR circuit 45. Based on the driving signal, the control logic circuit 44 outputs a driving signal SP to the switching means 46 for commanding a pilot injection for a predetermined period of injection, and after the driving signal SP, outputs a holding voltage applying command SWH to the holding current output circuit 43 for a predetermined period of time. Thus, a high voltage is applied to a solenoid valve corresponding to the sequential injection command signal DRVn from the step-up circuit 21, and after an initial load current promptly rises, a holding current is outputted from the holding current output circuit 43, and a pilot injection is executed with good responsiveness. In addition, after a predetermined period of time from the holding voltage applying command SWH, the control logic circuit 44 outputs a driving signal SM to the switching means 47 for commanding main injection for a predetermined period of injection, and after the driving signal SM, outputs the holding voltage applying command SWH to the holding current output circuit 43 for a predetermined period of time. Thus, after a high voltage is applied, to the same solenoid valve as that at the pilot injection, from the step-up circuit 31 and an initial load current promptly rises, a holding current is outputted from the holding current output circuit 43 and main injection is executed with good responsiveness. When the sequential injection command signal DRVn is turned OFF, the corresponding one of the switching means 49a to 49f is turned OFF and the holding current becomes OFF, whereby the fuel injection for the corresponding cylinder is completed.

Thereafter, when the sequential injection command signal DRVn, corresponding to a cylinder to be injected next, is turned ON, a corresponding one of the switching means 49a through 49f is electrified, and a high voltage at the time of pilot injection is outputted by the step-up circuit 21. After a predetermined period of time, a high voltage at the time of main injection is outputted by the step-up circuit 31. Since the step-up circuit 21 and the step-up circuit 31 store ample energy in the capacitors 24 and 34 at this time, there is no delay in the solenoid valves, and the timing and quantity of fuel injection are precisely controlled. Moreover, the holding currents for pilot injection and main injection are supplied by a single holding current output circuit 43, thus decreasing the configuration in size and in cost.

Next, a fourth embodiment will be explained based on FIGS. 10 and 11. The present embodiment shows the configuration with more economical effect as compared with the configuration in the third embodiment. The configuration in the present embodiment differs from the configuration in FIG. 8 only in the connections of the capacitors 24 and 34, and only the different connections will be explained. The output of the single step-up circuit 21 is connected to the anodes of two diodes 151 and 152 in parallel. The cathode of the diode 151 is connected to the switching means 46 and to the capacitor 24, and the cathode of the diode 152 is connected to the switching means 47 and to the capacitor 34. In the present embodiment, the diodes 151 and 152 are used as rectifying devices. A general inductive circuit (not shown) including an inductance or the like is provided in the step-up circuit 21. Thus, energy from the step-up circuit 21 is stored in the two capacitors 24 and 34 through the inductive circuit and the diodes 151 and 152. Accordingly, the step-up circuit 21, the diodes 151 and 152, and the capacitors 24 and 34 in the present embodiment correspond to the plurality of step-up circuits 21 and 31 in the aforesaid embodiments. The remainder of the configuration is the same as that in FIG. 8.

Next, the operation under the aforesaid configuration will be explained with reference to FIG. 11. It is assumed that equal quantities of electric charge are stored in the two capacitors 24 and 34. When a sequential injection command signal DRVn is outputted in synchronization with the injection timing for a corresponding one of the cylinders and the sequential injection command signal DRVn is turned ON in the same way as in the aforesaid embodiments, a corresponding one of the switching means 49a through 49f is electrified and a driving signal is outputted from the OR circuit 45. Based on the driving signal, the control logic circuit 44 outputs a driving signal SP to the switching means 46 for commanding a pilot injection for a predetermined period of injection. After the output, the control logic circuit 44 outputs a holding voltage applying command SWH to the holding current output circuit 43 for a predetermined period of time. Thus, high-voltage energy (namely, electric charge) stored in the capacitor 24 is given to the solenoid valve corresponding to the sequential injection command signal DRVn, and an initial load current promptly rises. After the rise, a holding current is outputted from the holding current output circuit 43, and a pilot injection is executed with good responsiveness. At this time, the electric charge Q1 of the capacitor 24 is discharged to almost zero while the driving signal SP is outputted, and the output voltage V1 is also lowered to almost 0 volt with the discharge. An electric charge stored in the capacitor 34 is prevented from moving to the capacitor 24 by the diode 152. Then, when the output of the driving signal SP is turned OFF, the switching means 46 is turned OFF, energy is supplied to the capacitor 24 from the step-up circuit 21, and the electric charge Q1 and the output voltage V1 are gradually increased.

In addition, after a predetermined period of time from the holding voltage applying command SWH, the control logic circuit 44 outputs a driving signal SM to the switching means 47 for commanding a main injection for a predetermined period of injection, and after the driving signal SM, outputs the holding voltage applying command SWH to the holding current output circuit 43 for a predetermined period of time. Thus, after high-voltage energy stored in the capacitor 34 is given to the same solenoid valve as that at the above pilot injection and the initial load current promptly rises, a holding current is outputted from the holding current output circuit 43 and a main injection is executed with good responsiveness. At this time, the electric charge Q2 of the capacitor 34 is discharged to almost zero while the driving signal SM is outputted, and the output voltage V2 is also lowered to almost 0 volt with the discharge. While the output voltage V2 is lowered, energy is supplied to the capacitor 24 until the output voltage V1 exceeds the output voltage V2 and the stored electric charge Q1 is prevented from moving to the capacitor 34 by the diode 151. Then, when the output of the driving signal SM is turned OFF, the switching means 47 is turned OFF, energy is supplied to the capacitor 34 from the step-up circuit 21, and the electric charge Q2 and the output voltage V2 are gradually increased.

Thereafter, at a point of time when the output voltage V2 of the capacitor 34 becomes equal to the output voltage V1 of the capacitor 24, the output energy of the step-up circuit 21 is divided between the two capacitors 24 and 34 and stored in them via the diodes 151 and 152. Therefore, the electric charges Q1 and Q2, and the output voltages V1 and V2 of the two capacitors respectively increase to predetermined values at the same rise speed.

When the sequential injection command signal DRVn is turned OFF, the corresponding one of the switching means 49a through 49f is turned OFF and a holding current becomes OFF, whereby the fuel injection for the corresponding cylinder is completed. When the injection timing for the next injection cylinder arrives, the corresponding sequential injection command signal DRVn is outputted, and a pilot injection and a main injection for the next injection cylinder are executed with good responsiveness in the same way as in the above.

If the time period to store high-voltage energy in the two capacitors 24 and 34 is sufficient, the output voltages V1 and V2 can be stepped up to the desired high voltages. If the time periods between the driving signals SP and between the driving signals SM for two cylinders, the injection times for which are next to each other, are represented by T3 and T4 respectively, it is adequate that the output voltages V1 and V2 are stepped up to the desired high voltages within the period of time T3 and the period of time T4, respectively. Accordingly, the shortest possible periods of times T3 and T4 are calculated from the specification of the maximum engine speed of the engine, and it is sufficient that the output current capacity of the step-up circuit 21 is set so as to make the output voltages V1 and V2 to be the desired high voltages within the shortest possible periods of time T3 and T4. At this time, the step-up circuit 21 needs to charge the two capacitors 24 and 34 which have the same capacity as the capacitors 24 and 34 in the aforesaid embodiments respectively within the period of time T3 and T4 which are almost the same. Consequently, the output current capacity of the step-up circuit 21 is almost twice as large when compared with the aforesaid embodiments. However, when the period of time T1 between a pilot injection timing and a main injection timing is extremely shorter than the injection timing interval T2 between two cylinders, that is, shorter than the periods of time T3 and T4 as intended in the present invention, the aforesaid performance can be satisfied with a much smaller output current capacity as compared with a single step-up circuit in the prior art. If the case of two step-up circuits and the case of a single step-up circuit are compared, the effects of "a decrease in setting space of the step-up circuit" and "a decrease in cost" are larger than that of "an increase in output quantity" produced by the configuration with the single step-up circuit, depending on the relationship between the period of time T1 and the period of time T3 and T4. Thus, there is a case wherein the configuration with the single step-up circuit is more advantageous. As a result, the device as a whole can be decreased in cost and in size, and the reliability can be improved.

Figure 12:
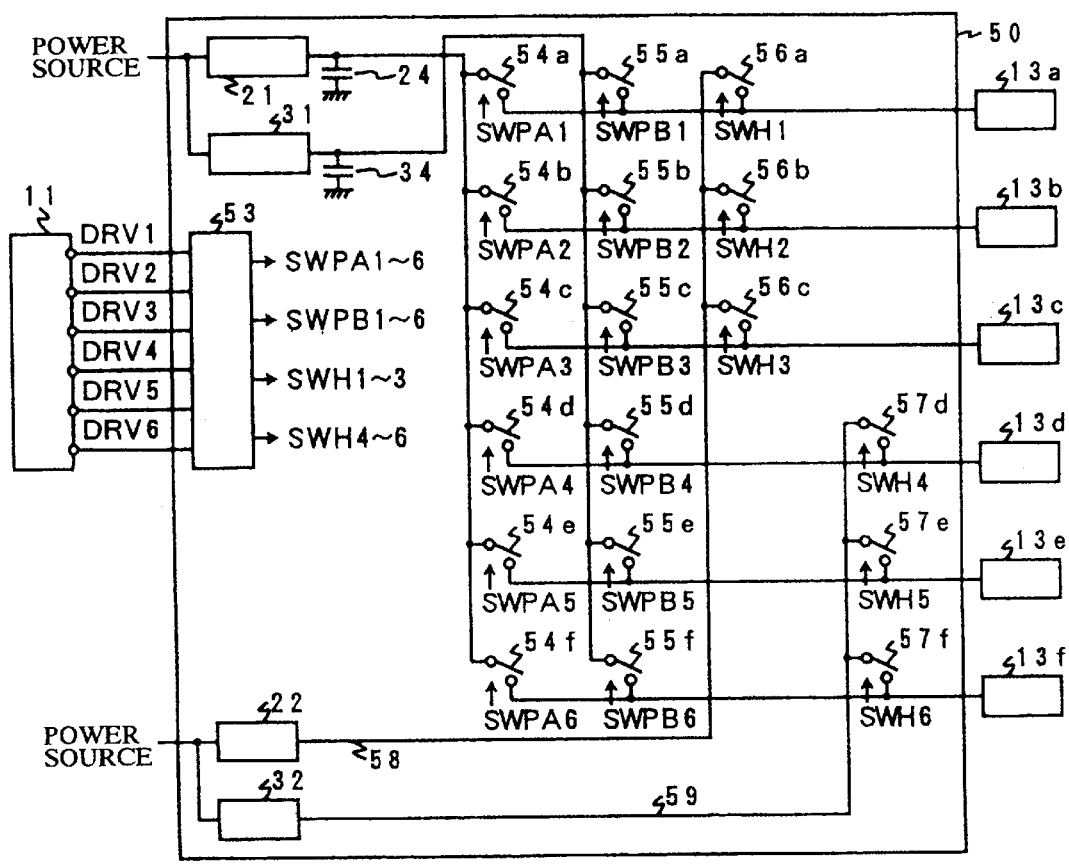
FIG. 12 is a block diagram of an inductive load driving device in a fifth embodiment according to the present invention.

Next, a fifth embodiment will be explained based on FIGS. 12 and 13. The step-up circuit 21 is exclusively for use for pilot injection, and the output thereof is connected to switching means 54a through 54f and to the capacitor 24. The step-up circuit 31 is exclusively for use for main injection and the output thereof is connected to switching means 55a through 55f and to the capacitor 34. The holding current output circuits 22 and 32 are each for both the use for the pilot injection and the use for the main injection. The output of the holding current circuit 22 is connected to the switching means 56a through 56c, and the output of the holding current output circuit 32 is connected to the switching means 57d through 57f. The outputs of the switching means 54a through 54f and the outputs of the switching means 55a through 55f are connected to the solenoid valves 13a through 13f, respectively, in parallel. The outputs of the switching means 56a through 56c are connected to the solenoid valves 13a through 13c respectively, and the outputs of the switching means 57d through 57f are connected to the solenoid valves 13d through 13f respectively. When the cylinders corresponding to the respective solenoid valves 13a through 13f are C1 to C6 and the injection order of the cylinders is C1→C5→C3→C6→C2→C4→C1, a group of the switching means 56a through 56c and a group of the switching means 57d through 57f are exclusively assigned to two cylinder groups (C1, C2, and C3; and C4, C5, and C6),which are alternately injected.

A control logic circuit 53 inputs a sequential injection command signal DRVn (n=1 to 6) corresponding to a respective one of the cylinders from the initial driving signal output division 11, generates the high voltage applying commands SWPAn and SWPBn and a holding voltage applying command SWHn based on the sequential injection command signal DRVn, and controls the opening and closing of each of the aforesaid switching means by these commands. The high voltage applying command SWPAn is inputted to the corresponding one of the switching means 54a through 54f, the high voltage applying command SWPBn is inputted to the corresponding one of the switching means 55a through 55f, and the holding voltage applying command SWHn is inputted to the corresponding one of the switching means 56a through 56c and the switching means 57d through 57f.

Figure 13:
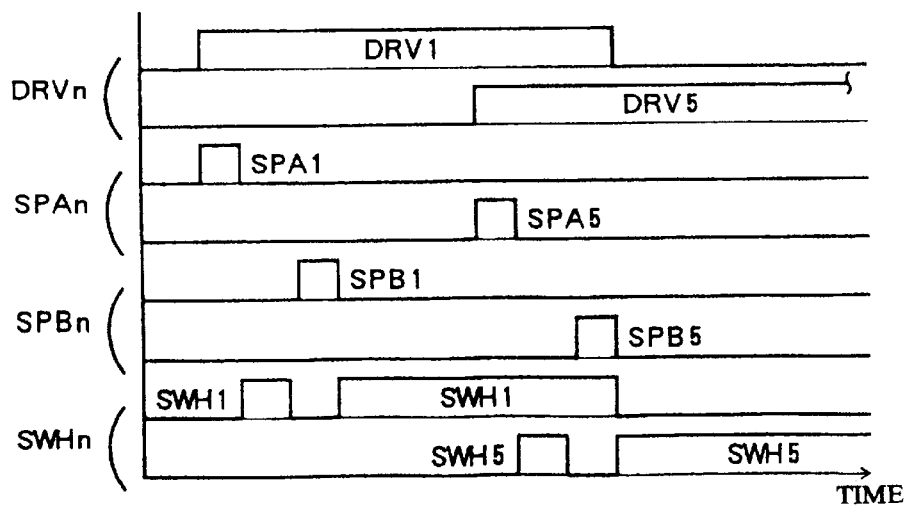
FIG. 13 is a timing chart of respective signals in the fifth embodiment according to the present invention.

In FIG. 13, the sequential injection command signal DRVn is outputted in synchronization with the injection timing for the respective cylinder. It is now assumed that a sequential injection command signal DRV1 is turned ON when the injection timing of the first cylinder C1 arrives. Based on the sequential injection command signal DRV1, the control logic circuit 53 outputs to the switching means 54a a high voltage applying command SWPA1 for commanding a pilot injection for the first cylinder C1 for a predetermined injection period, and after the high voltage applying command SWPA1, outputs a holding voltage applying command SWH1 to the switching means 56a for a predetermined period of time. Thus, a high voltage is applied to the solenoid valve 13a from the step-up circuit 21 and an initial load current promptly rises. Thereafter, a holding current is outputted from the holding current output circuit 22. Consequently, a pilot injection is executed with good responsiveness. In addition, after a predetermined period of time from the holding voltage applying command SWH1, the control logic circuit 53 outputs to the switching means 55a a high voltage applying command SWPB1 for commanding a main injection for a predetermined injection period, and after the high voltage applying command SWPB1, outputs the holding voltage applying command SWH1 to the switching means 56a while the sequential injection command signal DRV1 is ON. Thus, after a high voltage is applied to the solenoid valve 13a from the step-up circuit 31 and an initial load current promptly rises, a holding current is outputted from the holding current output circuit 22. Consequently, a main injection is executed with good responsiveness. When the sequential injection command signal DRV1 is turned OFF, the switching means 56a is turned OFF and the output of a holding current is OFF, whereby a fuel injection for the first cylinder C1 is completed.

Since a sequential injection command signal DRV5, corresponding to the fifth cylinder C5 to be injected next, is thereafter turned ON, based on the sequential injection command signal DRV5 similarly to the above, sequentially a high voltage applying command SWPA5 is outputted to the switching means 54e, a holding voltage applying command SWH5 is outputted to the switching means 57e, a high voltage applying command SWPB5 is outputted to the switching means 55e, and the holding voltage applying command SWH5 is outputted to the switching means 57e. Thus, a pilot injection and a main injection are executed with good responsiveness. Thereafter, the same operations are conducted in relation to the other cylinders.

Since the step-up circuits 21 and 31 store ample energy in the capacitors 24 and 34 at the injection timing for the next injection cylinder under the aforesaid configuration, there is no delay in the response of each solenoid valve, and the timing and the quantity of fuel injection are precisely controlled.

In the present invention, it is possible to send a holding current of the solenoid valve 13e by the switching means 57e independently of a holding current of the solenoid valve 13a by the switching means 56a, when the engine speed is increased and the next sequential injection command signal DRV5 is turned ON while the sequential injection command signal DRV1 is ON. As described above, the exclusive holding current output circuits 22 and 32, exclusive lines 58 and 59 for the holding currents, exclusive groups of the switching means 56a through 56c and the switching means 57d through 57f are provided corresponding to the groups of cylinders which are alternately injected. Therefore, even when an initial part and a last part of the injection periods of respective cylinders overlap each other, the respective holding currents can be continued.

Figure 10:
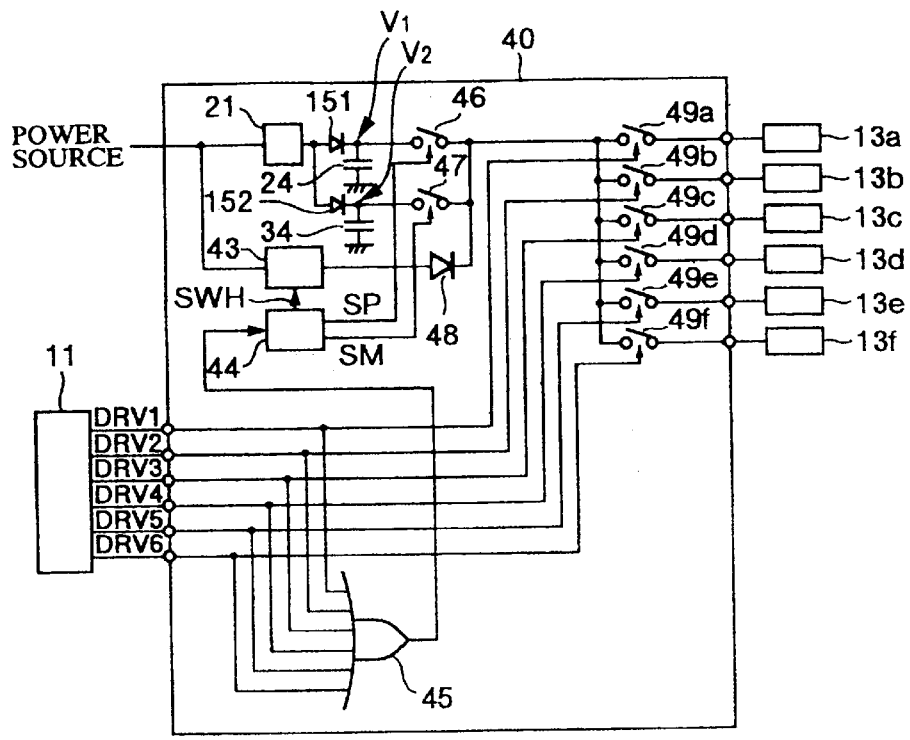
FIG. 10 is a block diagram of an inductive load driving device in a fourth embodiment according to the present invention.
Figure 11:
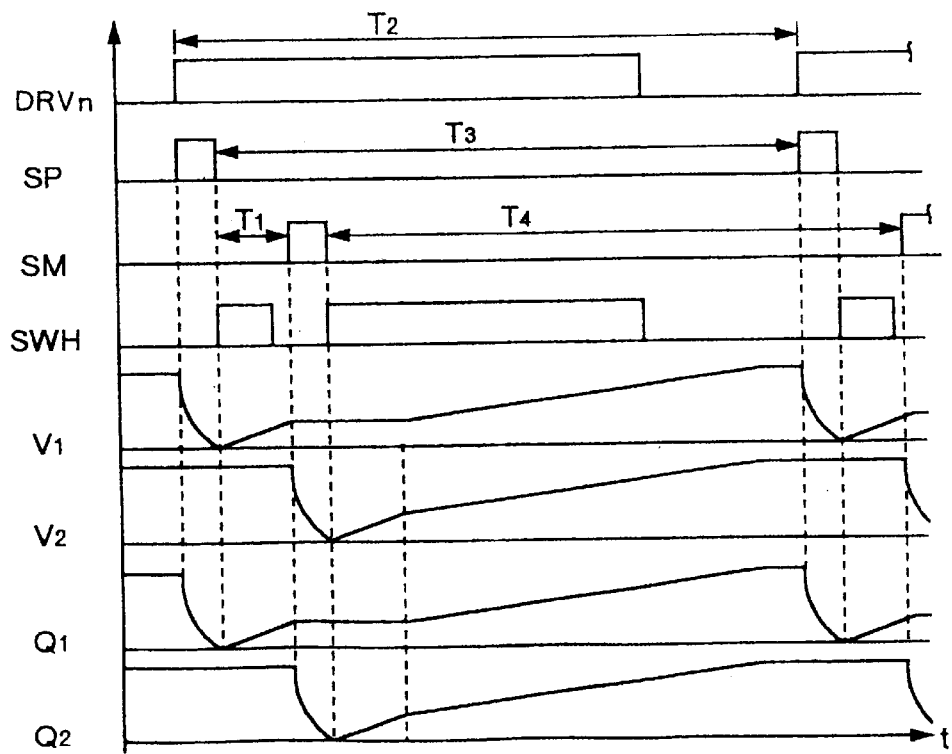
FIG. 11 is a timing chart of respective signals in the fourth embodiment according to the present invention.

Moreover, also in the present invention, energy can be supplied to the two capacitors 24 and 34 via the diodes 151 and 152, respectively, from the single step-up circuit 21 as shown in FIG. 10. The operation of storing high-voltage energy in the capacitors 24 and 34 and the operational effect by the whole configuration are the same as in the above.

Next, a sixth embodiment will be explained based on FIGS. 14 and 15. The present embodiment shows an example in which an initial part and a last part of the injection periods of respective cylinders can overlap each other, and an example of a three-cylinder engine will now be explained.

Figure 14:
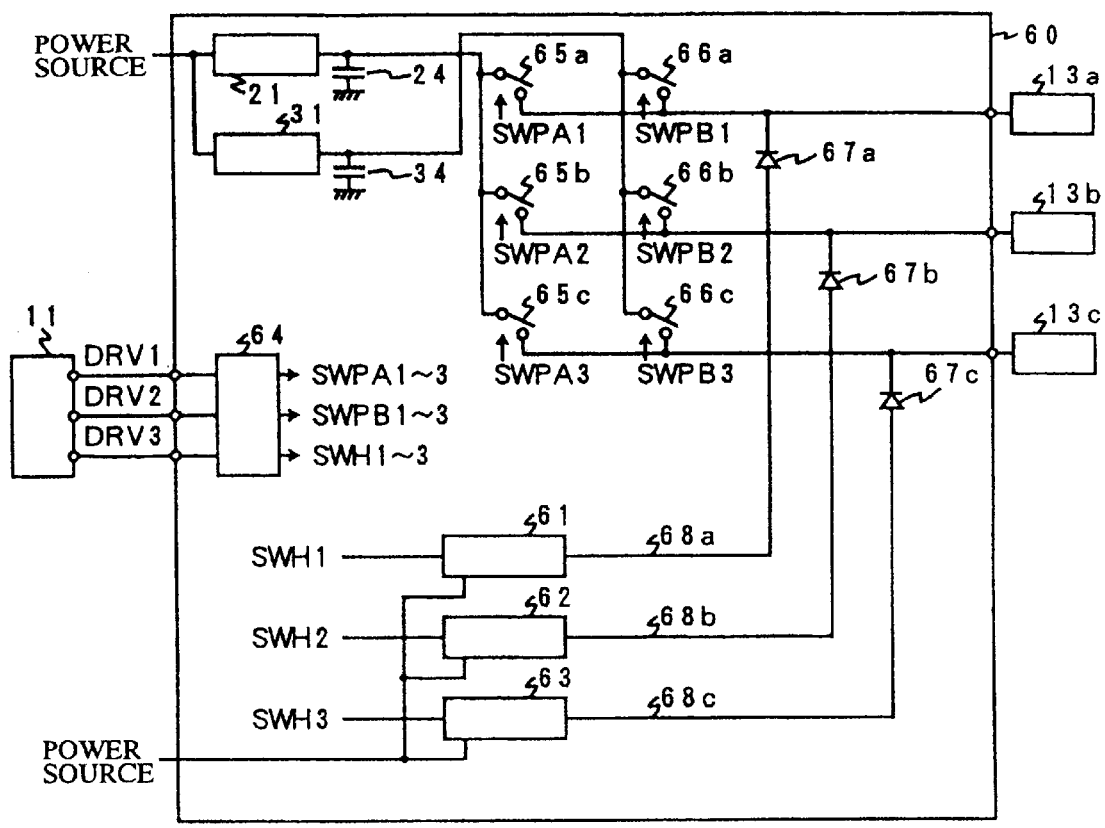
FIG. 14 is a block diagram of an inductive load driving device in a sixth embodiment according to the present invention.

In FIG. 14, the step-up circuit 21 is exclusively used for pilot injection and the output thereof is connected to the switching means 65a through 65c and to the capacitor 24. The step-up circuit 31 is exclusively used for main injection and the output thereof is connected to the switching means 66a through 66c and to the capacitor 34. The outputs of the switching means 65a and 66a are connected to the solenoid valve 13a in parallel, the outputs of the switching means 65b and 66b are connected to the solenoid valve 13b in parallel, and the outputs of the switching means 65c and 66c are connected to the solenoid valve 13c in parallel. Holding current output circuits 61, 62, and 63 are exclusively used for the solenoid valves 13a through 13c, respectively, corresponding to the respective cylinders, and are each for both the use for pilot injection and the use for main injection. The output of the holding current output circuit 61 is connected to the anode of a diode 67a, and the cathode of the diode 67a is connected to the solenoid valve 13a. The output of the holding current output circuit 62 is connected to the solenoid valve 13b by way of a diode 67b, and the output of the holding current output circuit 63 is connected to the solenoid valve 13c by way of a diode 67c.

A control logic circuit 64 sequentially inputs an injection command signal DRVn (n=1 to 3) corresponding to a respective one of the cylinders from the initial driving signal output division 11, generates the high voltage applying commands SWPAn and SWPBn and a holding voltage applying command SWHn based on the sequential injection command signal DRVn, and controls the opening and closing of each of the aforesaid switching means by these commands and the output timing of the holding current output circuits 61, 62, and 63. The high voltage applying command SWPAn is inputted to the corresponding one of the switching means 65a through 65c, the high voltage applying command SWPBn is inputted to the corresponding one of the switching means 66a through 66c, and the holding voltage applying command SWHn is inputted to each of the holding current output circuits 61, 62, and 63.

Figure 15:
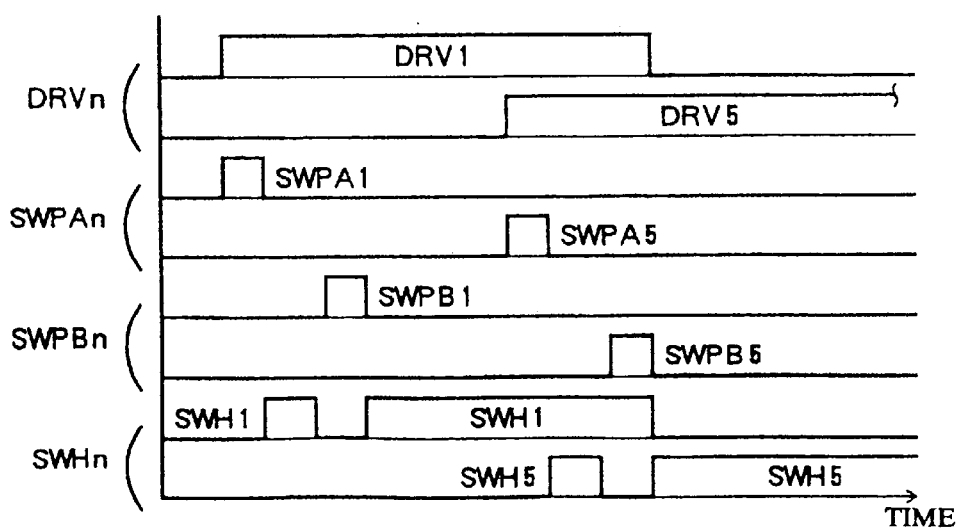
FIG. 15 is a timing chart of respective signals in the sixth embodiment according to the present invention.

In FIG. 15, if the sequential injection command signal DRVn is turned ON in synchronization with the injection timing of the corresponding cylinder, the control logic circuit 64 outputs to a corresponding one of the switching means 65a through 65c the high voltage applying command SWPAn for commanding a pilot injection to the respective cylinder for a predetermined injection period based on the sequential injection command signal DRVn. Subsequently, the control logic circuit 64 outputs the holding voltage applying command SWHn to a corresponding one of the holding current output circuits 61, 62, and 63 for a predetermined period of time after the high voltage applying command SWPAn. Thus, after a high voltage is applied to a corresponding one of the solenoid valves 13a through 13c from the capacitor 24 and an initial load current promptly rises, a holding current is outputted from a corresponding one of the holding current output circuits 61, 62, and 63. Consequently, a pilot injection is executed with good responsiveness. In addition, after a predetermined period of time from the holding voltage applying command SWHn, the control logic circuit 64 outputs to a corresponding one of the switching means 66a through 66c the high voltage applying command SWPBn for commanding a main injection for the corresponding cylinder for a predetermined injection period, and after the high voltage applying command SWPBn, outputs the holding voltage applying command SWHn to a corresponding one of the holding current output circuits 61, 62, and 63 while the sequential injection command signal DRVn is ON. Thus, after a high voltage is applied to a corresponding one of the solenoid valves 13a through 13c from the capacitor 34 and an initial load current promptly rises, a holding current is outputted from a corresponding one of the holding current output circuits 61, 62, and 63. Consequently, a main injection is executed with good responsiveness. When the sequential injection command signal DRVn is turned OFF, the holding voltage applying command SWHn is turned OFF and the output of a holding current becomes OFF, whereby the fuel injection for the respective cylinder is completed.

When the sequential injection command signal DRVn, corresponding to a cylinder to be injected next, is thereafter turned ON, similarly to the above, the high voltage applying command SWPAn, the holding voltage applying command SWHn, the high voltage applying command SWPBn, and the holding voltage applying command SWHn are sequentially outputted based on the sequential injection command signal DRVn. Since the step-up circuits 21 and 31 store ample energy in the capacitors 24 and 34 at this time, there is no delay in each solenoid valve, and the timing and the quantity of fuel injection are precisely controlled.

In addition, when the sequential injection command signal DRVn, for a cylinder to be injected next, is turned ON while the sequential injection command signal DRVn corresponding to some cylinder is still ON, the holding current can be continued even when an initial part and a last part of the injection periods of the two cylinders overlap each other, since the exclusive holding current output circuits 61, 62, and 63, and the exclusive lines 68a, 68b, and 68c for the holding currents corresponding to the respective cylinders are provided. Incidentally, the present embodiment is not limited to engines with three cylinders. This embodiment also can be implemented in the engines with an optional number of cylinders, if exclusive holding current output circuits and exclusive lines for holding currents for respective cylinders are provided. Also in the present embodiment, energy can be supplied from the single step-up circuit 21 to the two capacitors 24 and 34 via the diodes 151 and 152, respectively, as shown in FIG. 10. The operation of storing high-voltage energy or the like is the same as the above.

Although the step-up circuit 21 and the step-up circuit 31 are exclusively used at the time of the pilot injection and the main injection, respectively, in the present embodiment, the present invention is not limited to this case. It can be used as in the explanation of the second embodiment. Specifically, it is also possible that after the first step-up circuit 21 is used at the time of a pilot injection and the second step-up circuit 31 is used at the time of a main injection in some cylinder (for example, the first cylinder), the second step-up circuit 31 can be used at the time of a pilot injection and the first step-up circuit 21 can be used at the time of a main injection for the next cylinder (for example, the second cylinder). In other words, the first step-up circuit 21 and the second step-up circuit 31 can be alternately used at the times of pilot injection and main injection.

Next, a seventh embodiment will be explained based on FIGS. 16 and 17. The present embodiment shows another example in which an initial part and a last part of the injection periods of respective cylinders in the three-cylinder engine can overlap each other.

In FIG. 16, the step-up circuit 21 is exclusively used for pilot injection and the output thereof is connected to the switching means 74a through 74c and to the capacitor 24. The step-up circuit 31 is exclusively used for main injection and the output thereof is connected to switching means 75a through 75c and to the capacitor 34. The holding current output circuits 71 and 72 are each for both the use for the pilot injection and the use for the main injection and are alternately assigned to each of the cylinders. The output of the holding current output circuit 71 is connected to the input terminals of the switching means 76a through 76c, and the output of the holding current output circuit 72 is connected to the input terminals of the switching means 77a through 77c. The outputs of the switching means 74a, 75a, 76a, and 77a are connected to the solenoid valve 13a in parallel, the outputs of the switching means 74b, 75b, 76b, and 77b are connected to the solenoid valve 13b in parallel, and the outputs of the switching means 74c, 75c, 76c, and 77c are connected to the solenoid valve 13c in parallel.

A control logic circuit 73 inputs a sequential injection command signal DRVn (n=1 to 3) corresponding to a respective one of the cylinders from the initial driving signal output division 11, generates the high voltage applying commands SWPAn and SWPBn and the holding voltage applying commands SWHAn and SWHBn based on the sequential injection command signal DRVn, and controls the opening and closing of each of the aforesaid switching means by these commands. The high voltage applying command SWPAn is inputted to the corresponding one of the control terminals of the switching means 74a through 74c, and the high voltage applying command SWPBn is inputted to the corresponding one of the control terminals of the switching means 75a through 75c. The holding voltage applying command SWHAn is inputted to the corresponding one of the control terminals of the switching means 76a through 76c, and the holding voltage applying command SWHBn is inputted to the corresponding one of the control terminals of the switching means 77a through 77c.

In FIG. 17, the sequential injection command signal DRVn (n=1 to 3) is turned ON in synchronization with the injection timing for each respective cylinder. It is now assumed that the cylinders are numbered C1 to C3, respectively, the injection order is C1→C2→C3, and a sequential injection command signal DRV1 for the first cylinder C1 is turned ON. Upon receipt of the sequential injection command signal DRV1, the control logic circuit 73 outputs to the switching means 74a a high voltage applying command SWPA1 for commanding a pilot injection and outputs a holding voltage applying command SWHA1 to the switching means 76a. Thus, a high voltage is applied to the solenoid valve 13a from the capacitor 24, and an initial load current promptly rises. Thereafter, a holding current is outputted from the holding current output circuit 71. Consequently, a pilot injection is executed with good responsiveness. In addition, after a predetermined period of time from the holding voltage applying command SWHA1, the control logic circuit 73 outputs to the switching means 75a a high voltage applying command SWPB1 for commanding a main injection, and after the high voltage applying command SWPB1, outputs the holding voltage applying command SWHA1 to the switching means 76a while the sequential injection command signal DRV1 is ON. Thus, after a high voltage is applied to the solenoid valve 13a from the capacitor 34 and an initial load current promptly rises, a holding current is outputted from the holding current output circuit 71. Consequently, a main injection is executed with good responsiveness. When the sequential injection command signal DRV1 is turned OFF, the holding voltage applying command SWHA1 is turned OFF and the output of a holding current is turned OFF, whereby the fuel injection for this cylinder is completed.

When a sequential injection command signal DRV2, corresponding to the second cylinder C2 to be injected next, is thereafter turned ON, upon receipt of the sequential injection command signal DRV2, the control logic circuit 73 sequentially outputs a high voltage applying command SWPA2 to the switching means 74b, outputs a holding voltage applying command SWHB2 to the switching means 77b, outputs a high voltage applying command SWPB2 to the switching means 75b, and outputs the holding voltage applying command SWHB2 to the switching means 77b while the sequential injection command signal DRV2 is ON. Thus, a pilot injection and a main injection are executed with good responsiveness. Since the step-up circuits 21 and 31 store ample energy in the capacitors 24 and 34 at this time, there is no delay in each solenoid valve, and the timing and the quantity of fuel injection are precisely controlled.

In the above case, the holding current output circuits 71 and 72 and the exclusive lines 78 and 79 for the holding currents corresponding to the first cylinder C1 and the second cylinder C2, respectively, are used, and the switching means 76a and 77b are separately turned ON. Accordingly, even when an initial part and a last part of the injection periods of respective cylinders overlap each other as is the case where the next sequential injection command signal DRV2 is turned ON while the sequential injection command signal DRV1 is ON as described above, a holding current can be continued.

Thereafter, in the same way as in the above for the third cylinder C3, the step-up circuit 21 is exclusively used for pilot injection and the step-up circuit 31 is exclusively used for main injection. Correspondingly to the above circuits, a high voltage is applied to the solenoid valve 13c by the switching means 74c and the switching means 75c. In the present embodiment, as for a holding current, the switching means 76a through 76c and the switching means 77a through 77c are alternately used so as to send a holding current even when an initial period and a last period of the respective sequential injection command signals DRVn, corresponding to respective cylinders, overlap each other. Specifically, the control logic circuit 73 controls the output destinations of the holding voltage applying commands SWHA1 through SWHA3 and SWHB1 through SWHB3 in order that the sequence relative to the holding currents of the switching means 76a through 76c and 77a through 77c is 76a→77b→76c→77a→76b→77c→76a.

Also in the present embodiment, energy can be supplied from a single step-up circuit 21 to the two capacitors 24 and 34 via the diodes 151 and 152, respectively, as shown in FIG. 10. The operation of storing high-voltage energy or the like is the same in as the above.

An embodiment of a step motor will be explained hereinafter.

Figure 18:
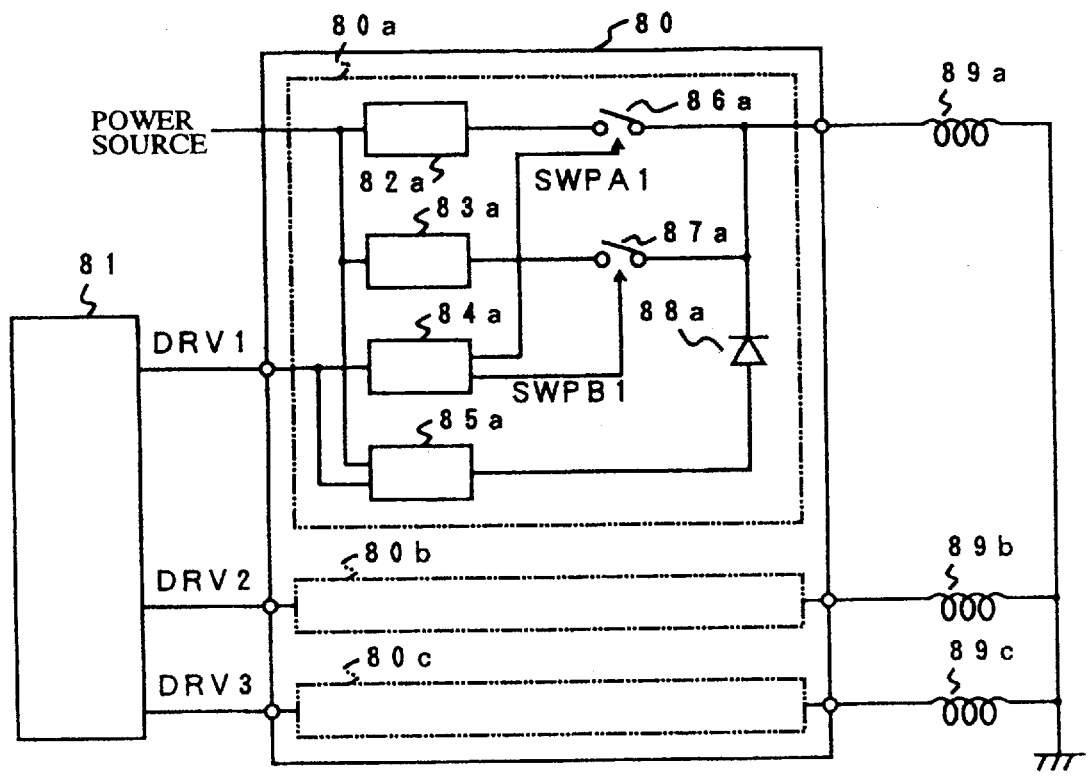
FIG. 18 is a block diagram of an inductive load driving device in an eighth embodiment according to the present invention.
Figure 19:
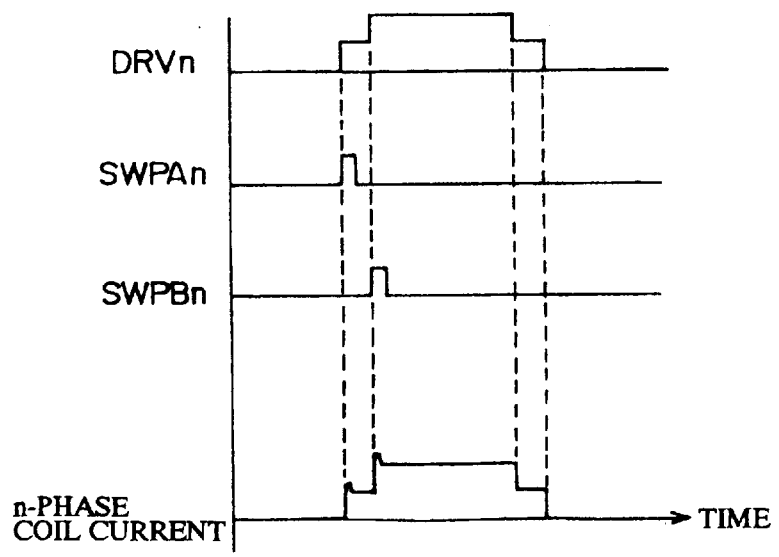
FIG. 19 is a timing chart of respective signals in the eighth embodiment according to the present invention.

An eighth embodiment will be explained with reference to FIG. 18 and FIG. 19. The present embodiment shows an example of an equivalent twelve-phase driving system of a three-phase step motor. A driving signal generator 81 controls an exciting current of each phase coil in synchronization with the drive frequency of the step motor and outputs to a driving device 80 a driving command DRVn (n=1 to 3) for commanding the current value of the respective phase coil. In this case, the driving command DRVn can be executed with either an analog signal (which commands the magnitude of an exciting current value responsive to the magnitude of a voltage signal, for example) or a digital signal (which commands the magnitude of an exciting current value responsive to the magnitude of numerical data, for example). FIG. 19 shows an example of the driving command DRVn with the analog signal in which the magnitude of an exciting current value is represented by each level of a step-shaped signal.

Driving circuits 80a, 80b, and 80c, for driving phase coils 89a, 89b, and 89c respectively, are provided in the driving device 80. The respective configurations of the driving circuits 80a, 80b, and 80c are the same, and the driving circuit 80a will now be explained as the representative.

The driving circuit 80a includes a first step-up circuit 82a, a second step-up circuit 83a, a level variation detector 84a, and a constant current output circuit 85a. The constant current output circuit 85a corresponds to the holding current output circuit 43 in the aforesaid embodiments. Energy storing capacitors, for generating a high voltage such as the capacitor 24 in the aforesaid embodiments, are contained in the first and the second step-up circuits 82a and 83a, respectively. The output of the first step-up circuit 82a is connected to a first phase coil 89a via a switching means 86a and the output of the second step-up circuit 83a is connected to the first phase coil 89a via a switching means 87a.

A level variation detector is provided as a control logic circuit, and the level variation detector 84a inputs a driving command DRV1 for the first phase coil 89a and detects a variation in the signal level of the driving command DRV1. The level variation detector 84a generates high voltage applying commands SWPA1 and SWPB1, based on a predetermined level variation, and outputs the high voltage applying commands SWPA1 and SWPB1 to the switching means 86a and the switching means 87a, respectively, for a predetermined period of time. In addition a constant current output circuit is provided as a holding current output circuit, since constant current driving is conducted so as to hold an exciting current of each phase coil in a general step motor. The constant current output circuit 85a inputs the driving command DRV1 and outputs a constant current corresponding to the signal level of the driving command DRV1. The constant current is supplied to the first phase coil 89a via a diode 88a.

Similarly, in the driving circuit 80b, a first step-up circuit 82b, a second step-up circuit 83b, a level variation detector 84b, a constant current output circuit 85b, a switching means 86b, a switching means 87b, and a diode 88b are provided. In the driving circuit 80c, a first step-up circuit 82c, a second step-up circuit 83c, a level variation detector 84c, a constant current output circuit 85c, a switching means 86c, a switching means 87c, and a diode 88c are provided.

The operation will be explained with reference to FIG. 19. When inputting the driving command DRVn corresponding to a respective phase coil, the level variation detector 84a, 84b, or 84c detects the level variation of the driving command DRVn, and outputs a high voltage applying command SWPAn to the switching means 86a, 86b, or 86c, respectively, for a predetermined period of time when the level reaches a first level. Thus, a first high voltage is applied from the first step-up circuit 82a, 82b, or 82c to the phase coils 89a, 89b, or 89c, respectively, and an exciting current promptly rises. After completion of the high voltage applying command SWPAn, the constant current output circuit 85a, 85b, or 85c outputs a first constant current equivalent to the above level while a first level signal of the driving command DRVn continues.

When the level of the driving command DRVn reaches a second level, the level variation detector 84a, 84b, or 84c outputs a high voltage applying command SWPBn to the switching means 87a, 87b, or 87c, respectively, for a predetermined period of time. At this time, ample energy is stored in the energy storing capacitor of the second step-up circuits 83a, 83b, or 83c. Thus, a second high voltage is applied from the second step-up circuit 83a, 83b, or 83c to the phase coil 89a, 89b, or 89c respectively, and an exciting current promptly rises. After completion of the high voltage applying command SWPBn, the constant current output circuit 85a, 85b, or 85c outputs a second constant current equivalent to the above level while a second level signal of the driving command DRVn continues.

Thereafter, when the level of the driving command DRVn returns to the first level, the constant current output circuit 85a, 85b, or 85c immediately outputs the first constant current. In addition, when the driving command DRVn is turned OFF (the level is not detected), the constant current output circuit 85a, 85b, or 85c immediately stops the output.

As described above, in the driving circuits 80a, 80b, and 80c, the first step-up circuits 82a, 82b, and 82c, for allowing an exciting current to promptly rise at the first level, and the second step-up circuits 83a, 83b and 83c, for allowing an exciting current to promptly rise at the second level, are exclusively provided. Accordingly, the rotational frequency of the step motor increases; and even when the time interval between the first level and the second level is shortened, the rise of exciting current at each level is no longer delayed, and an equivalent twelve-phase driving with good responsiveness can be obtained.

Also in each of the driving circuits 80a, 80b, and 80c in the present embodiment, similarly to the fourth embodiment, high-voltage energy can be supplied to two capacitors (which correspond to the capacitors 24 and 34) for the levels of the first and the second exciting currents via two diodes by a single step-up circuit (for example, the step-up circuit 82a). At this time, the operation of storing high-voltage energy in the two capacitors and the operation and effect by the entire configuration are the same as the above.

Figure 20:
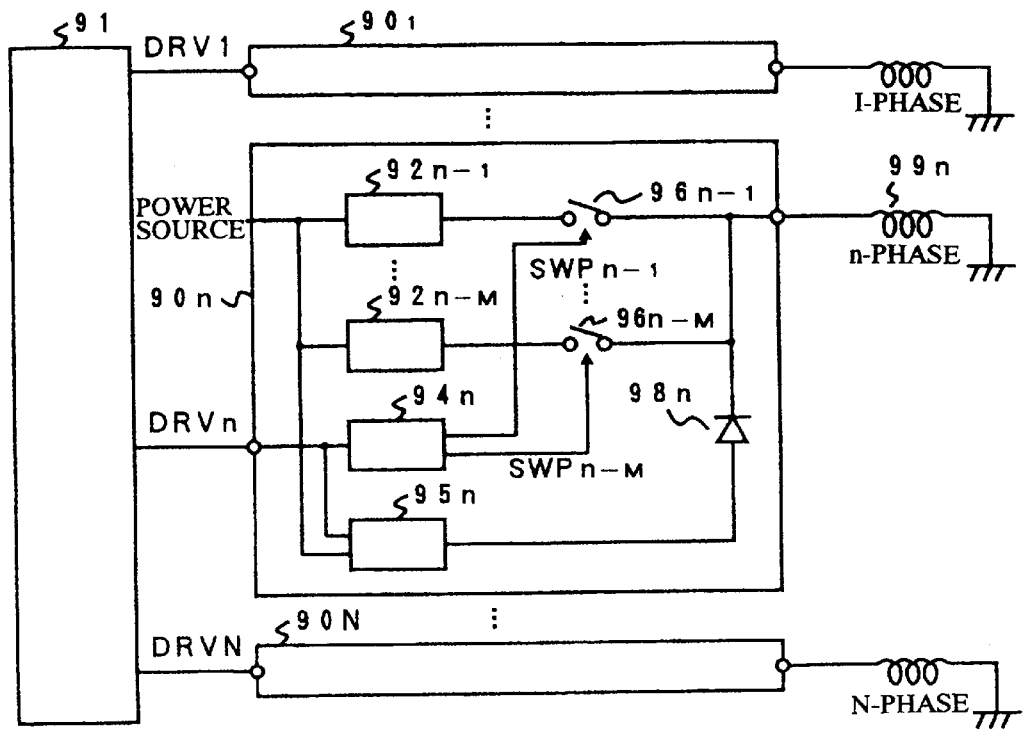
FIG. 20 is a block diagram of an inductive load driving device in a ninth embodiment according to the present invention.
Figure 21:
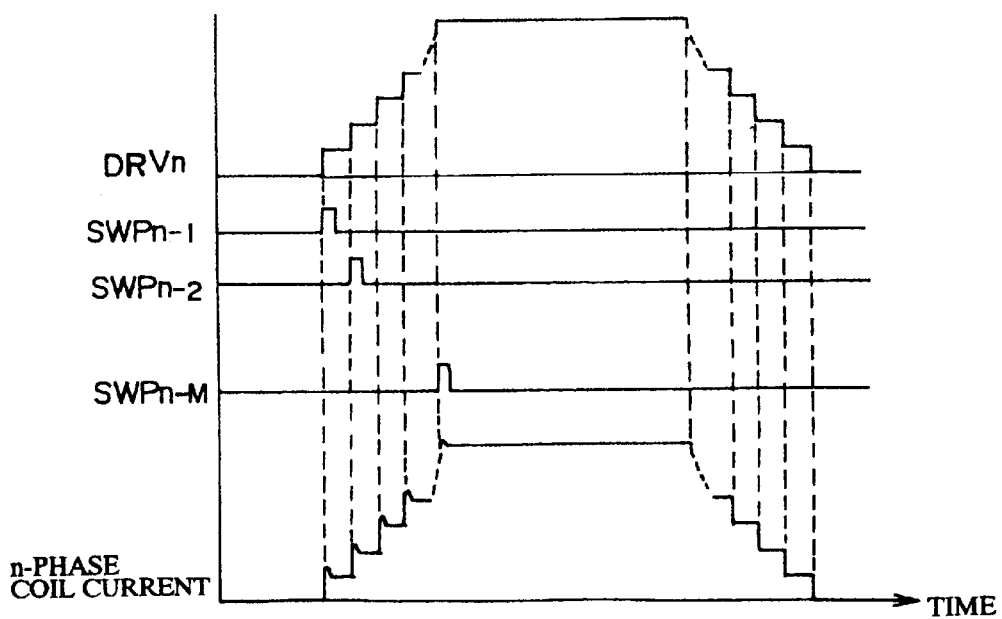
FIG. 21 is a timing chart of respective signals in the ninth embodiment according to the present invention.
Figures 22, 23:
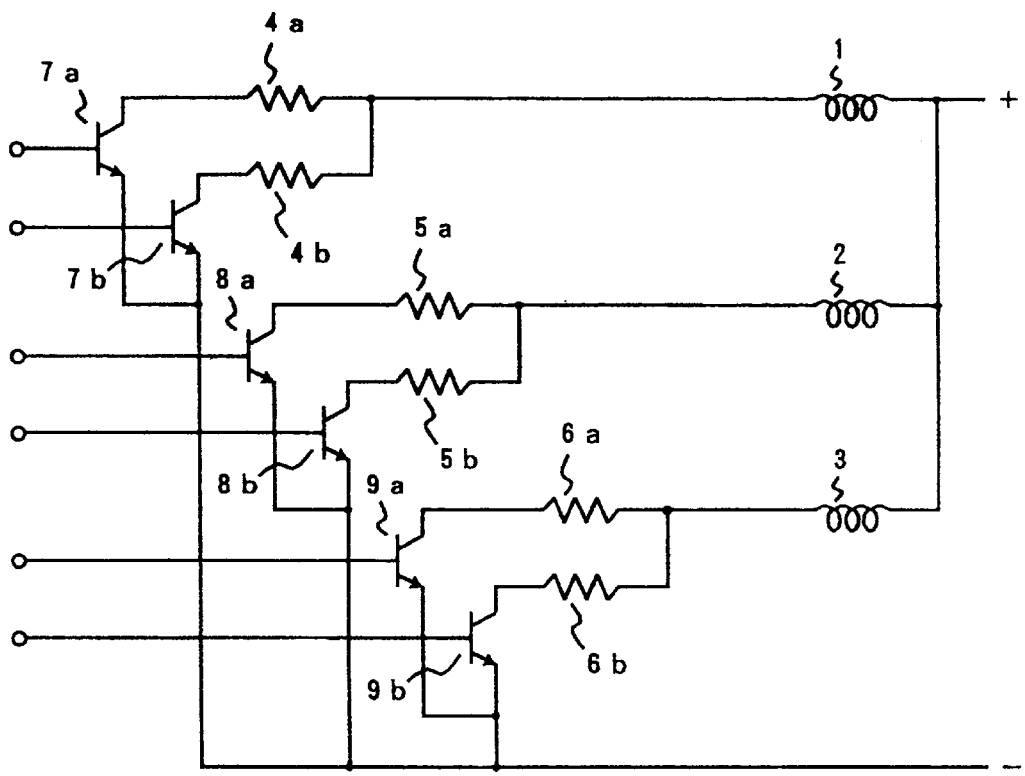
FIG. 22 is an example of a circuit diagram of an equivalent twelve-phase driving system of a step motor according to a prior art.
FIG. 23 is an exciting sequence diagram of the step motor in FIG. 22.

Next, a ninth embodiment will be explained with reference to FIGS. 20 and 21. The present embodiment shows a case with an equivalent polyphase driving system which further generalizes the eighth embodiment. Similarly to the driving signal generator 81, a driving signal generator 91 controls an exciting current of each phase coil and outputs a driving command DRVn (n=1 to N) for commanding the current value of a respective phase coil of a N-phase step motor to a driving circuit 90n for the respective phase. Here, the driving command DRVn can be conducted with either an analog signal or a digital signal, similarly to the above. FIG. 21 shows an example of the driving signal DRVn with the analog signal.

Each driving circuit 90n drives the corresponding phase coil 99n and includes M step-up circuits 92n-1, 92n-2, . . . and 92n-M, a level variation detector 94n, a constant current output circuit (a holding current output circuit) 95n, switching means 96n-1, 96n-2, . . . and 96n-M, and a diode 98n. M is a natural number of 2 or more, and each of the step-up circuits 92n-1, 92n-2, . . . and 92n-M contains an energy storing capacitor for generating a high voltage as described above. The outputs of the step-up circuits 92n-1, 92n-2, . . . and 92n-M are connected to a n-phase coil 99n via the switching means 96n-1, 96n-2, - and 96n-M respectively.

Each level variation detector 94n detects a variation in the signal level of the driving signal DRVn for the n-phase coil 99n. The level variation detector 94n generates the high voltage applying commands SWPn-1, SWPn-2, . . . and SWPn-M based on predetermined level variation, and outputs the high voltage applying commands SWPn-1, SWPn-2, . . . and SWPn-M to the switching means 96n-1, 96n-2, and 96n-M respectively for a predetermined period, of time. Each constant current output circuit 95n inputs the driving command DRVn and outputs a constant current corresponding to the signal level of the driving command DRVn. This constant current is supplied to the n-phase coil 99n via the diode 98n.

The operation will be explained with reference to FIG. 21. When inputting the driving signal DRVn corresponding to the n-phase coil 99n, each level variation detector 94n detects the level variation of the driving command DRVn. When the detected level reaches a first predetermined level, each level variation detector 94n outputs the high voltage applying command SWPn-1 to the switching means 96n-1 for a predetermined period of time. Thus, a first high voltage is applied from a first step-up circuit 92n-1 to the n-phase coil 99n and an exciting current promptly rises. After the completion of the high voltage applying command SWPn-1, the constant current output circuit 95n outputs a first constant current corresponding to a first predetermined level while the first predetermined level signal of the driving command DRVn continues.

Subsequently, the level of the driving command DRVn sequentially varies from a second predetermined level to the level of M. When the level reaches the M level, each level variation detector 94n outputs the high voltage applying command SWPn-M to the switching means 96n-M for a predetermined period of time. Thus, an M high voltage from an M step-up circuit 92n-M is applied to the n-phase coil 99n and an exciting current promptly rises. After the completion of the high voltage applying command SWPn-M, the constant current output circuit 95n outputs an M constant current corresponding to the M level while an M level signal of the driving command DRVn continues.

Thereafter, when the driving command DRVn sequentially returns to a lower current value level, the constant current output circuit 95n immediately outputs a lower level of constant current in sequence. Besides, when the driving command DRVn is turned OFF, the constant current output circuit 95n instantly stops the output.

As described above, in each driving circuit 90n, M step-up circuits 92n-1, 92n-2, . . . and 92n-M each corresponding to each predetermined level are exclusively provided in order to allow an exciting current to promptly rise at each predetermined level. Therefore, the rotation of the step motor is speeded up, and even when the elapsed time interval between respective levels is shortened, the rise of exciting current at each level is no longer delayed and an equivalent polyphase driving with good responsiveness can be obtained.

Also in each driving circuit 90n in the present embodiment, similarly to the fourth embodiment, high-voltage energy can be supplied to M capacitors (which correspond to the capacitors 24 and 34) for M levels of exciting currents via M diodes by a single step-up circuit (for example, the step-up circuit 92n-1) respectively. At this time, the operation of storing high-voltage energy in the M capacitors and the operation and effect by the entire configuration are the same as the above.

Industrial Availability

The present invention is useful as an inductive load driving device and a driving method in which the same inductive load can be driven a plurality of times within a predetermined period of time without increasing a step-up circuit in size and the rise of load current at an initial stage of driving can be executed at high speed.

What is claimed is:

1. An inductive load driving device which is suitable for driving a same inductive load a plurality of times within a predetermined period of time and for executing that driving repeatedly, wherein said same inductive load is a respective solenoid, of a respective one of solenoid valves in fuel injectors for respective cylinders of an internal combustion engine, which controls a start time and a finish time of fuel injection by the respective one of the solenoid valves; said inductive load driving device comprising:

a plurality of step-up circuits, each for alternately storing energy to step up a voltage to a high voltage and then applying the resulting high voltage to a respective same inductive load within a predetermined period of time, to allow a respective resulting load current to rise at high speed;

a single holding current output circuit, for applying a predetermined voltage to a respective same inductive load, after the respective resulting load current has been raised responsive to a respective one of said plurality of step-up circuits, to hold the respective resulting load current at a predetermined value;

a plurality of switching means, which are switchable in such a manner that a respective output of said plurality of step-up circuits and an output of said single holding current output circuit are alternately connected to a respective same inductive load; and a control logic circuit for switching said plurality of switching means in a predetermined sequence; and wherein said plurality of step-up circuits includes a first step-up circuit and a second step-up circuit;

wherein said first step-up circuit and said single holding current output circuit drive solenoids in the fuel injectors corresponding to respective cylinders in the internal combustion engine at times of pilot injection for the respective cylinder;

wherein said second step-up circuit and said single holding current output circuit drive, at each respective time of main injection, the same respective solenoid that was driven at a respective time of pilot injection for the respective cylinder;

wherein said plurality of switching means execute switching from/to outputs of said first step-up circuit at a time of a pilot injection to/from outputs of said second step-up circuit at a time of a main injection.

2. An inductive load driving device which is suitable for driving a same inductive load a plurality of times within a predetermined period of time and for executing the driving repeatedly, wherein said same inductive load is a respective solenoid, of a respective one of solenoid valves in fuel injectors for respective cylinders of an internal combustion engine, which controls a start time and a finish time of fuel injection by the respective one of the solenoid valves into a respective cylinder of said internal combustion engine, said inductive load driving device comprising:

a plurality of step-up circuits, each for alternately storing energy to step up a voltage to a high voltage and then applying the resulting high voltage to a respective same inductive load within a predetermined period of time, to allow a respective resulting load current to rise at high speed;

a single holding current output circuit, for applying a predetermined voltage to a respective same inductive load, after the respective resulting load current has been raised responsive to a respective one of said plurality of step-up circuits, to hold the respective resulting load current at a predetermined value;

a plurality of switching means which are switchable in such a manner that a respective output of said plurality of step-up circuits and an output of said single holding current output circuit are alternately connected to a respective same inductive load; and a control logic circuit for switching said plurality of switching means in a predetermined sequence; and wherein said plurality of step-up circuits includes a first step-up circuit and a second step-up circuit;

wherein said first step-up circuit and said single holding current output circuit drive a first solenoid in a fuel injector corresponding to a first cylinder in the internal combustion engine at a time of pilot injection for said first cylinder, and drive a second solenoid corresponding to a second cylinder, which injects fuel next after said first cylinder, at a time of main injection for said second cylinder, and those drivings at a time of a pilot injection and at a time of a main injection are repeated for other combinations of cylinders;

wherein said second step-up circuit and said single holding current output circuit drive the first solenoid, corresponding to said first cylinder, at a time of main injection for said first cylinder, and drive the second solenoid, corresponding to the second cylinder which injects fuel next after said first cylinder, at a time of pilot injection for said second cylinder, and those drivings at the time of a main injection and at a time of pilot injection are repeated for other combinations of cylinders; and wherein said plurality of switching means executes switching from/to outputs of said first step-up circuit and said single holding current output circuit, at a time of pilot injection, to/from outputs of said second step-up circuit and said single holding current output circuit, at a time of main injection, or executes switching from/to outputs of said first step-up circuit and said single holding current output circuit, at a time of main injection, to/from outputs of said second step-up circuit and said single holding current output circuit, at a time of pilot injection.

3. An inductive load driving device which is suitable for driving a same inductive load a plurality of times within a predetermined period of time and for executing the driving repeatedly, wherein said same inductive load is a respective one of a plurality of phase coils in a step motor, said inductive load driving device comprising:

a plurality of step-up circuits, each for alternately storing energy to step up a voltage to a high voltage and then applying the resulting high voltage to a respective same inductive load within a predetermined period of time, to allow a respective resulting load current to rise at high speed;

a holding current output circuit, for applying a predetermined voltage to a respective same inductive load, after the respective resulting load current has been raised responsive to a respective one of said plurality of step-up circuits, to hold the respective resulting load current at a predetermined value;

a plurality of switching means which are switchable in such a manner that a respective output of said plurality of step-up circuits and an output of said holding current output circuit are alternately connected to a respective same inductive load; and a level variation circuit for switching said plurality of switching means.

4. An inductive load driving device in accordance with claim 3, wherein said plurality of step-up circuits include a first step-up circuit and a second step-up circuit;

wherein said first step-up circuit allows an exciting current at a first level to rise at high speed;

wherein said second step-up circuit allows an exciting current at a second level to rise at high speed, and wherein said holding current output circuit can provide an exciting current at a first level and at a second level and is provided for a respective one of said plurality of phase coils in said step motor; and wherein said plurality of switching means switches respective outputs of said first step-up circuit and said second step-up circuit.

5. An inductive load driving device in accordance with claim 3, wherein a phase current in a respective phase coil in said step motor can be set at a plurality of levels;

wherein each respective one of said plurality of step-up circuits is provided for a respective phase coil in said step motor to allow an exciting current to rise at high speed at each level of said plurality of levels; and wherein said holding current output circuit holds an exciting current for a respective phase coil at each level of said plurality of levels.

6. An inductive load driving device which is suitable for driving same inductive load a plurality of times within a predetermined period of time and for executing the driving repeatedly, said inductive load driving device comprising:

a plurality of step-up circuits, each for alternately storing energy to step up a voltage to a high voltage and then applying the resulting high voltage to a respective same inductive load within a predetermined period of time, to allow a respective resulting load current rise to a high speed;

a single holding current output circuit, for applying a predetermined voltage to a respective same inductive load, after the respective resulting load current has been raised responsive to a respective one of said plurality of step-up circuits, to hold the respective resulting load current at a predetermined value;

a plurality of switching means which are switchable in such a manner that a respective output of said plurality of step-up circuits and an output of said single holding current output circuit are alternately connected to a respective same inductive load; and a control circuit for switching said plurality of switching means in a predetermined sequence.

7. An inductive load driving device in accordance with claim 6 wherein said same inductive load is a respective one of a plurality of inductive loads;

wherein said plurality of step-up circuits include a first step-up circuit and a second step-up circuit;

wherein said first step-up circuit and a single holding current output circuit drive a first one of said plurality of inductive loads during a first time period; and wherein said second step-up circuit and said single holding current output circuit drive said first one of said plurality of inductive loads during a second time period.

8. An inductive load driving device in accordance with claim 7, wherein said first step-up circuit and said single holding current output circuit drive a second one of said plurality of inductive loads during a third time period; and wherein said second step-up circuit and said single holding current output circuit drive said second one of said plurality of inductive loads during a fourth time period.

9. An inductive load driving device in accordance with claim 7, wherein each of said plurality of inductive loads is a solenoid in a solenoid valve in a fuel injector for a respective cylinder of an internal combustion engine having a plurality of cylinders.

10. An inductive load driving device in accordance with claim 9, wherein each solenoid controls a start time and a finish time of fuel injection by the respective fuel injector.

11. An inductive load driving device in accordance with claim 10, wherein said first time period is a time of pilot injection for a first one of said plurality of cylinders, and wherein said second time period is a time of main injection for said first one of said plurality of cylinders.

12. An inductive load driving device in accordance with claim 7, wherein said first step-up circuit and said single holding current output circuit drive a second one of said plurality of inductive loads during a third time period; and wherein said second step-up circuit and said single holding current output circuit drive said second one of said plurality of inductive loads during a fourth time period;

wherein each of said plurality of inductive loads is a solenoid in a solenoid valve in a fuel injector for a respective cylinder of an internal combustion engine having a plurality of cylinders;

wherein each solenoid controls a start time and a finish time of fuel injection by the respective fuel injector.

13. An inductive load driving device in accordance with claim 12, wherein said first time period is a time of pilot injection for a first one of said plurality of cylinders;

wherein said second time period is a time of main injection for said first one of said plurality of cylinders;

wherein said third time period is a time of pilot injection for a second one of said plurality of cylinders; and wherein said fourth time period is a time of main injection for said second one of said plurality of cylinders.

* * * * *